United States Patent
Zane et al.

(10) Patent No.: US 10,063,066 B2
(45) Date of Patent: Aug. 28, 2018

(54) BATTERY CONTROL

(71) Applicants: UTAH STATE UNIVERSITY, North Logan, UT (US); UNITED STATES DEPARTMENT OF ENERGY, Washington, DC (US); ALLIANCE FOR SUSTAINABLE ENERGY, LLC, Golden, CO (US)

(72) Inventors: Regan A. Zane, North Logan, UT (US); Michael Evzelman, Logan, UT (US); Daniel Costinett, Knoxville, TN (US); Dragan Maksimovic, Boulder, CO (US); Richard Dyche Anderson, Plymouth, MI (US); Kandler Smith, Golden, CO (US); Michael Scott Trimboli, Colorado Springs, CO (US); Gregory Loren Plett, Colorado Spings, CO (US)

(73) Assignee: Utah State University, Logan, UT (US)

( * ) Notice: Subject to any disclaimer, the term of this patent is extended or adjusted under 35 U.S.C. 154(b) by 316 days.

(21) Appl. No.: 14/591,917

(22) Filed: Jan. 7, 2015

(65) Prior Publication Data
US 2015/0214757 A1   Jul. 30, 2015

Related U.S. Application Data

(60) Provisional application No. 61/924,644, filed on Jan. 7, 2014.

(51) Int. Cl.
*H02J 7/00* (2006.01)
*H02J 1/10* (2006.01)
*H02M 3/335* (2006.01)

(52) U.S. Cl.
CPC ............ *H02J 7/0016* (2013.01); *H02J 1/102* (2013.01); *H02J 7/0021* (2013.01); *H02J 7/0052* (2013.01); *H02J 7/0068* (2013.01); *H02M 3/33507* (2013.01); *H02J 2007/0059* (2013.01)

(58) Field of Classification Search
USPC ....................................................... 320/119
See application file for complete search history.

(56) References Cited

U.S. PATENT DOCUMENTS

| 5,264,777 | A  | 11/1993 | Smead  |
| 6,873,134 | B2 | 3/2005  | Canter |
| 7,605,492 | B2 | 10/2009 | Elder  |

(Continued)

OTHER PUBLICATIONS

International Searching Authority, Notification of Transmittal of the Written Opinion of the International Searching Authority, or the Declaration, for PCT Application PCT/US2015/010537.

(Continued)

*Primary Examiner* — Robert Grant

(57) ABSTRACT

For battery control, an apparatus includes a shared bus and a plurality of isolated direct current (DC) to DC bypass converters. Each bypass converter is associated with one battery unit. Inputs of each bypass converter are in parallel electrical communication with the associated battery unit. Outputs of each bypass converter are in parallel electrical communication with the shared bus. Each bypass converter estimates a battery state for each battery unit and controls the battery state to a reference state.

20 Claims, 27 Drawing Sheets

(56) References Cited

U.S. PATENT DOCUMENTS

| | | |
|---|---|---|
| 2002/0070705 A1 | 6/2002 | Buchanan |
| 2005/0077867 A1 | 4/2005 | Cawthorne |
| 2006/0033473 A1 | 2/2006 | Stanzel |
| 2008/0042493 A1 | 2/2008 | Jacobs |
| 2010/0013306 A1 | 1/2010 | Heineman |
| 2011/0140536 A1 | 6/2011 | Adest |
| 2012/0043923 A1 | 2/2012 | Ikriannikov |
| 2012/0228931 A1* | 9/2012 | Butzmann ............ H01M 10/425 307/10.1 |
| 2012/0319657 A1* | 12/2012 | Ke ........................ H02J 7/0021 320/134 |
| 2013/0038289 A1 | 2/2013 | Tse |
| 2013/0144547 A1* | 6/2013 | Yun .................... G01R 31/3624 702/63 |
| 2014/0042815 A1 | 2/2014 | Maksimovic |
| 2014/0312844 A1 | 10/2014 | Mercier |

OTHER PUBLICATIONS

Costinett, Daniel et al., Active Balancing System for Electric Vehicle with Incorporated Low Voltage Bus, DOI: 10.1109/APEC. 2014.6803768 Conference: IEEE Applied Power Electronics Conference and Exposition APEC, Mar. 2014, pp. 3230-3236.

Zane, Regan et al., Robust cell-level modeling and control of large battery packs, AMPED Kickoff Meeting Slides, Jan. 8-9, 2013.

Zane, Regan et al., Robust cell-level modeling and control of large battery packs, ARPA-E Innovation Summit Posters, Feb. 2013.

Reham, M. et al., Modular Approach for continuous Cell-Level Balancing to Improve Performance of Large Battery Packs, IEEE Energy Conversion Congress and Exposition, Sep. 14-18, 2014, Pittsburgh, PA.

Zeng, Yu et al., an Active Balancing System for Lithium-Ion Battery Pack, Proceedings of the 2nd International Conference on Computer Science and Electronics Engineering, Mar. 22-23, 2013, Hangzhou, China.

Zane, Regan et al., Robust cell-level modeling and control of large battery packs, AMPED Annual Meeting: Government Panel Review, Jan. 9, 2014.

Zane, Regan et al., Robust cell-level modeling and control of large battery packs, AMPED Annual Meeting Review, Jan. 8, 2014.

International Searching Authority, Notification of Transmittal of the International Search Report and the Written Opinion of the International Searching Authority, or The Declaration, for PCT Application PCT/US2015/010537.

Costinett, Daniel et al., Active Balancing System for Electric Vehicles with Incorporated Low Voltage Bus, DOI: 10.1109/APEC. 2014.6803768 Conference: IEEE Applied Power Electronics Conference and Exposition APEC, Mar. 2014, pp. 3230-3236.

Zane, Regan et al., Robust cell-level modeling and control of large battery packs, ARPA-E Innovation Summit Posters, Feb. 2013.

Zane, Regan, "Robust Cell-Level Modeling and Control of Large Battery Packs," AMPED Annual Meeting: Government Panel Review, Jan. 9, 2014.

Zane, Regan, "Robust Cell-Level Modeling and Control of Large Battery Packs," AMPED Annual Meeting Review, Jan. 8, 2014.

U.S. Appl. No. 15/224,123, filed Jul. 29, 2016, Office Action dated May 18, 2018.

* cited by examiner

261

| Optical Data
262 |
|---|
| Unit Voltage
130 |
| Unit Current
109 |
| pH Data
264 |
| Strain Data
266 |
| Pressure Data
268 |
| Gas Composition Data
270 |

222

| Chemical Properties 282 |
| --- |
| Electrical Properties 284 |
| Thermal Properties 286 |
| Physical Properties 288 |

380

| Divergence Time Interval 382 |
| --- |
| Divergence Limits 384 |
| Control Constant 386 |
| Maximum Unit Voltage Limit 306 |
| Maximum Supply Current 390 |
| Predefined Unit Capacity 392 |
| Predefined Nominal Capacity 394 |
| Predefined Unit Resistance 396 |

BATTERY CONTROL

CROSS-REFERENCE TO RELATED APPLICATIONS

This application claims priority to U.S. Provisional Patent Application Ser. No. 61/924,644 entitled "BATTERY CONTROL" and filed on Jan. 7, 2014, which is incorporated herein by reference.

GOVERNMENT RIGHTS

This invention was made with government support. The government has certain rights in the invention.

BACKGROUND

Field

The subject matter disclosed herein relates to battery control and more particularly relates to battery reference based battery control.

Description of the Related Art

The charging and discharging of batteries is often controlled to improve performance.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
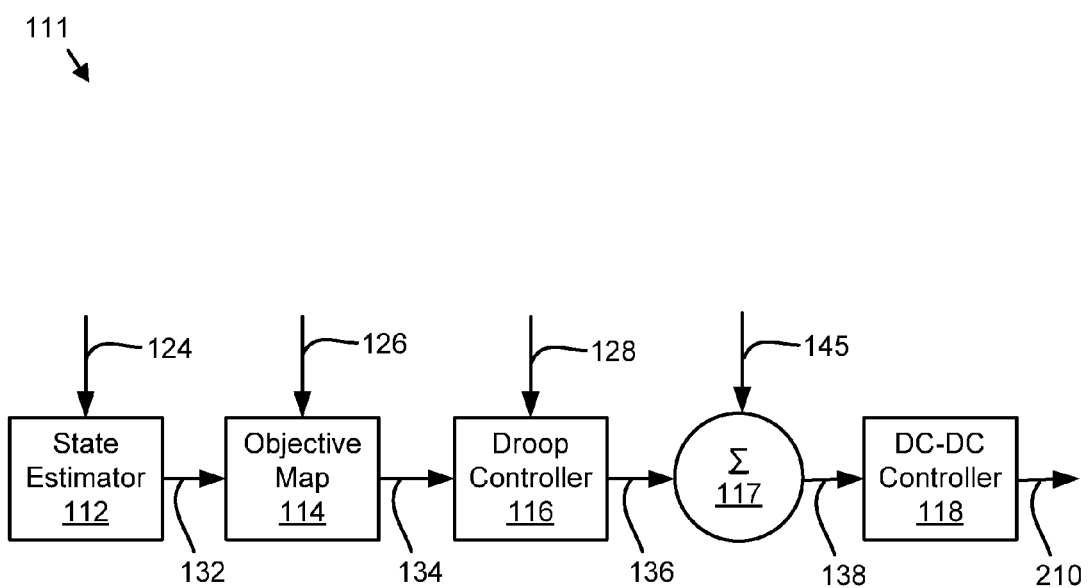
FIG. 1 is a schematic block diagram illustrating one embodiment of a battery controller.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements.

The articles and presentations Zane, Regan, et al. "Robust Cell-Level Modeling and Control of Large Battery Packs," Control Number 0675-1537; Costinett, Daniel, "Active Balancing System for Electric Vehicles and Incorporated Low Voltage Bus;" Zane, Regan, "Robust Cell-Level Modeling and Control of Large Battery Packs," AMPED Annual Meeting: Government Panel Review, Jan. 9, 2014; Zane, Regan, "Robust Cell-Level Modeling and Control of Large Battery Packs," AMPED Annual Meeting Review, Jan. 8, 2014; Zane, Regan, "Robust Cell-Level Modeling and Control of Large Battery Packs," AMPED Q3 Quarterly Review; Zane, Regan, "Robust Cell-Level Modeling and Control of Large Battery Packs," AMPED Poster (two pages); "Robust Cell-Level Modeling and Control of Large Battery Packs," AMPED Poster; Levron, Yoash et al. "Low Complexity Kalman Filter for Battery Charge Estimation;" and Zane, Regan, "Robust Cell-Level Modeling and Control of Large Battery Packs;" Technology, Advantages, and Differentiation are incorporated herein by reference.

In one aspect of the embodiments, an open circuit unit voltage $V_{OC,max}$ is controlled to an upper limit as $$V_{OC,max} = V_{max} - K \frac{\partial V_{OC}}{\partial Q}(Q - Q_i),$$

where $V_{max}$ is a maximum unit voltage limit, K is a nonzero control constant, $Q_i$ is a unit capacity of the given battery unit, and Q is one of a unit capacity of a maximum capacity battery unit, an average unit capacity of the plurality of battery units, and a predefined unit capacity.

In one aspect of the embodiments, an apparatus comprises a shared bus and a central controller controlling a plurality of direct current (DC) to DC bypass converters each with an associated battery unit, wherein outputs of each bypass converter are in parallel electrical communication with the shared bus, and the central controller determining a battery state for each battery unit and decreasing a rate of divergence of the battery state from a reference state.

In one aspect of the embodiments, an apparatus comprises a shared bus and a plurality of isolated balancing direct current (DC) to DC bypass converters, each bypass converter associated with one battery unit, inputs of each bypass converter in parallel electrical communication with the associated battery unit, outputs of each bypass converter in parallel electrical communication with the shared bus, and each bypass converter determining a battery state for the associated battery unit and decreasing a rate of divergence of the battery state from a reference state.

In one aspect of the embodiments, the battery state comprises one or more of a unit state-of-charge, a unit state-of-discharge, a unit capacity, a unit state-of-health, a unit impedance, a unit voltage, a unit current, a minimum unit voltage, a maximum unit voltage, a unit temperature, a unit power capability, a unit history, a unit electrochemical model parameter, and a unit life-prognostic model parameter and the reference state comprises one or more of a reference state-of-charge, a reference state-of-discharge, a reference capacity, a reference state-of-health, a reference unit impedance, a reference unit voltage, a reference unit current, a reference minimum unit voltage, a reference maximum unit voltage, a reference unit temperature, a reference power capability, a reference unit history, a reference unit electrochemical, and a reference unit life-prognostic.

In one aspect of the embodiments, the battery state for each battery unit is determined to reduce variability of any battery state between a plurality of battery units.

In one aspect of the embodiments, the variability of the battery state between the plurality of battery units is reduced over a divergence interval.

In one aspect of the embodiments, the apparatus further comprises a capacitor in parallel electrical communication with the shared bus.

In one aspect of the embodiments, the shared bus voltage is proportional to the reference state.

In one aspect of the embodiments, the apparatus comprises a central controller that senses the shared bus voltage.

In one aspect of the embodiments, the central controller communicates with the first plurality of bypass converters on one of an analog shared communications bus and a digital shared communications bus.

In one aspect of the embodiments, the central controller communicates a control signal to the first plurality of bypass converters that modifies the battery state.

In one aspect of the embodiments, central controller determines the battery state for each battery unit.

In one aspect of the embodiments, the divergence is a unit capacity mismatch.

In one aspect of the embodiments, the shared bus charges the battery units by supplying power from an external power supply to the shared bus.

In one aspect of the embodiments, a plurality of battery units is in series electrical communication.

In one aspect of the embodiments, the apparatus further comprises a current sensor that senses current in the series connection of the plurality of battery units.

In one aspect of the embodiments, the current sensor communicates over one of an analog bus and a digital bus to the first plurality of bypass converters.

In one aspect of the embodiments, the current sensor communicates with a central controller.

In one aspect of the embodiments, the shared bus provides power to one of a load and a bus supply that provides power to the load.

In one aspect of the embodiments, each bypass converter comprises a dual active bridge converter employing one of duty cycle control, frequency control, and phase shift control.

In one aspect of the embodiments, a battery unit comprises of one or more battery cells in parallel electrical communication.

In one aspect of the embodiments, a battery unit is comprised of one or more parallel connected battery cells in series electrical communication.

In one aspect of the embodiments, the apparatus further comprises a battery charger connected in parallel electrical communication to the plurality of battery units, and in communication with any one of a central controller, the shared bus, and the plurality of bypass converters, and wherein the battery charger modifies the charging current based on the communications.

In one aspect of the embodiments, the apparatus further comprises a second plurality of isolated balancing DC to DC bypass converters, each bypass converter associated with one battery unit, inputs of each bypass converter in parallel electrical communication with the associated battery unit and outputs of the second plurality of bypass converters in parallel electrical communication with the shared bus.

In one aspect of the embodiments, a first bypass converter cycles current through an associated first battery unit to heat the first battery unit.

In one aspect of the embodiments, the plurality of bypass converters further identify at least one battery unit with a battery state parameter that does not satisfy a reference state parameter and modify the battery state to decrease a rate of divergence of the battery reference parameter from the reference state parameter.

In one aspect of the embodiments, an apparatus comprises a shared bus and a plurality of isolated balancing direct current (DC) to DC bypass converters, each bypass converter associated with one battery unit, inputs of each bypass converter in parallel electrical communication with the associated battery unit, outputs of each bypass converter in parallel electrical communication with the shared bus, and each bypass converter controls the unit current as a function of a battery model of the associated battery unit.

In one aspect of the embodiments, a state-of-charge is calculated as a function of a unit voltage in a no load state In one aspect of the embodiments, the battery unit voltage in the no load state is calculated as a function of the unit voltage, a unit current, and a unit resistance In one aspect of the embodiments, a first bypass converter characterizes the associated battery unit in an off-line state In one aspect of the embodiments, a first bypass converter perturbs one of a unit current and a unit voltage of the first battery unit and characterizes the associated battery unit in response to the perturbation.

In one aspect of the embodiments, the characterization comprises one or more of a unit impedance, a unit capacity, a unit temperature, a unit state-of-charge, a unit state-of-health.

In one aspect of the embodiments, a first bypass converter performs a diagnostic on an associated first battery unit.

In one aspect of the embodiments, the first battery unit is heated to lower a unit impedance of the first battery unit.

In one aspect of the embodiments, an objective map of a battery controller uses model predictive control (MPC) to decrease a rate of divergence of the battery state from the reference state.

In one aspect of the embodiments, the battery model comprises a reduced-order electrochemical state estimation of internal battery processes.

In one aspect of the embodiments, the battery model determines the battery state in response to inputs from one or more of a temperature sensor, an optical sensor, a voltage sensor, a current sensor, a pH sensor, a strain sensor, a pressure sensor, and a gas composition sensor.

In one aspect of the embodiments, the battery model describes properties of the battery unit comprising chemical properties, electrical properties, thermal properties, and physical properties.

In one aspect of the embodiments, the chemical properties comprise one or more of a formation of dendrites, a gas composition, a gas pressure, and a unit pH.

In one aspect of the embodiments, the electrical properties comprise one or more of a unit impendence, a unit capacity, and a unit voltage.

In one aspect of the embodiments, the thermal properties comprise one or more of a unit temperature and a unit temperature distribution.

In one aspect of the embodiments, the physical properties comprise an expansion of a unit package.

In one aspect of the embodiments, an apparatus comprises a shared bus, a plurality of battery units, a plurality of isolated balancing direct current (DC) to DC bypass converters, each bypass converter associated with one battery unit of the plurality of battery units and inputs of each bypass converter in parallel electrical communication with the associated battery unit, outputs of each bypass converter in parallel electrical communication with the shared bus, and a plurality of isolated balancing direct current (DC) to DC bypass converters, each bypass converter associated with one battery unit of the plurality of battery units and inputs of each bypass converter in parallel electrical communication with the associated battery unit, outputs of each bypass converter in parallel electrical communication with the shared bus.

In one aspect of the embodiments, the battery controller controls a unit state-of-charge for a given battery unit as a function of a unit capacity mismatch between a unit capacity of the given battery unit and one of a unit capacity of a maximum capacity battery unit, an average unit capacity of the plurality of battery units, and a predefined unit capacity, such that a battery unit with a higher unit capacity reaches a higher maximum unit state-of-charge than a battery unit with a lower unit capacity.

In one aspect of the embodiments, a unit voltage $V_{OC}$ at open circuit of a given ith battery unit and is controlled to an upper limit calculated as $$V_{OC} = V_{max} - K \frac{\partial V_{OC}}{\partial Q}(Q - Q_i),$$

where $V_{max}$ is a maximum unit voltage limit, K is a nonzero control constant, $Q_i$ is a unit capacity of the given battery unit, and Q is one of a unit capacity of a maximum capacity battery unit, an average unit capacity of the plurality of battery units, and a predefined unit capacity.

In one aspect of the embodiments, the battery controller controls a unit state-of-charge for a given battery unit as a function of a unit capacity mismatch between a unit capacity of the given battery unit and one of a unit capacity of a maximum capacity battery unit, an average unit capacity, and a predefined unit capacity if the unit state-of-charge exceeds a control threshold and controls the unit state-of-charge for the given battery unit as a function of a unit resistance mismatch between a unit resistance of the given battery unit and one of an average unit resistance for the plurality of battery units, a unit resistance of a maximum resistance battery unit, and a predefined unit resistance if the unit state-of-charge is less than the control threshold.

In one aspect of the embodiments, a unit voltage $V_{OC,i}$ at open circuit of a given ith battery unit is controlled to a lower limit calculated as $V_{OC}=V_{min}-I_{max}(avg(R)-R_i)$ if the unit voltage is less than the control threshold, and controlled to an upper limit calculated as $$V_{OC} = V_{max} - K \frac{\partial V_{OC}}{\partial Q_i}(Q - Q_i)$$

if the unit voltage exceeds the control threshold, where $V_{max}$ is a maximum unit voltage limit, $V_{min}$ is a minimum unit voltage limit, K is a nonzero control constant and $Q_i$ is a unit capacity of the given battery unit, Q is one of a unit capacity of a maximum capacity battery unit, an average unit capacity of the plurality of battery units, and a predefined unit capacity, $I_{max}$ is a maximum unit current, $R_i$ is a unit resistance for the given battery unit, and R is an average unit resistance for the plurality of battery units.

In one aspect of the embodiments, Q is max(Q) and is calculated as max(Q)=$Q_i$+$\Delta Q_i$ where $\Delta Q_i$ is a unit capacity mismatch between the given battery unit and the maximum capacity battery unit and is calculated as $$\Delta Q_i = Q_i - \frac{m_i Q_i I_{str}}{m_{nom}(I_{str} + I_{g,i})},$$

where $I_{str}$ is a supply current, $I_{g,i}$ is a bypass converter input current for the given battery unit, $m_i$ is a capacity parameter for the given battery unit calculated as $$m_i = \frac{Q_i - b_i}{V_{bus}}$$

where $V_{bus}$ is a shared bus voltage, $b_i$ is a predefined capacity constant, and $m_{nom}$ is predefined nominal capacity In one aspect of the embodiments, the battery controller controls a unit state-of-charge for a given battery unit as a function of a unit capacity mismatch between a unit capacity of the given battery unit and one of a unit capacity of a maximum capacity battery unit, an average unit capacity, and a predefined unit capacity if the unit state-of-charge exceeds a control threshold and controls the unit state-of-charge for the given battery unit as a function of a unit resistance mismatch between a unit resistance of the given battery unit and one of an average unit resistance for the plurality of battery units, a unit resistance of a maximum resistance battery unit, and a predefined unit resistance if the unit state-of-charge is less than the control threshold.

In one aspect of the embodiments, a unit voltage $V_{OC,i}$ at open circuit of a given ith battery unit is controlled to a lower limit calculated as $V_{OC}=V_{min}-I_{max}(avg(R)-R_i)$ if the unit voltage is less than the control threshold, and controlled to an upper limit calculated as $$V_{OC} = V_{max} - K \frac{\partial V_{OC}}{\partial Q_i}(Q - Q_i)$$

if the unit voltage exceeds the control threshold, where $V_{max}$ is a maximum unit voltage limit, $V_{min}$ is a minimum unit voltage limit, K is a nonzero control constant and $Q_i$ is a unit capacity of the given battery unit, Q is one of a unit capacity of a maximum capacity battery unit, an average unit capacity of the plurality of battery units, and a predefined unit capacity, $I_{max}$ is a maximum unit current, $R_i$ is a unit resistance for the given battery unit, and R is an average unit resistance for the plurality of battery units.

In one aspect of the embodiments, the battery controller controls a unit state-of-charge for a given battery unit as a function of a unit state-of-charge mismatch between a state-of-charge of the given battery unit and a unit state-of-charge of a maximum state-of-charge battery unit if the unit state-of-charge exceeds a control threshold and controls the unit state-of-charge for the given battery unit as a function of a shared bus voltage, a unit voltage, and a unit resistance if the unit state-of-charge is less than the control threshold.

In one aspect of the embodiments, the a unit voltage $V_{OC}$ at open circuit is controlled to a $V_{OC}$ calculated as $$V_{OC} = \frac{V_{max}(V_{OC,i} - R_i|I_{max}|) - V_{min}(V_{OC,i} + R_i|I_{max}|)}{V_{max} - V_{min} - 2R_i|I_{max}|}$$

wherein $V_{OC,i}$ is a unit voltage at open circuit for a given ith battery unit, $V_{max}$ is a maximum unit voltage limit, $V_{min}$ is a minimum unit voltage limit, $R_i$ is a unit resistance for the given battery unit, and $I_{max}$ is a maximum unit current for the given battery unit if the unit state-of-charge is less than the control threshold In one aspect of the embodiments, controlling the battery state comprises extending a unit lifetime of the first plurality of battery units.

In one aspect of the embodiments, the battery state comprises a unit voltage.

In one aspect of the embodiments, the battery state comprises a unit state-of-charge.

In one aspect of the embodiments, the battery state comprises a unit state-of-discharge.

In one aspect of the embodiments, the battery state comprises a shared bus voltage.

In one aspect of the embodiments, the battery state for each battery unit is modified to extend a range of a first plurality of battery units for a drive cycle, wherein the range is a function of a sum of the unit power capabilities of the first plurality of battery units.

In one aspect of the embodiments, an apparatus comprises a shared bus and a plurality of isolated direct current (DC) to DC bypass converters, each bypass converter associated with one battery unit, inputs of each bypass converter in parallel electrical communication with the associated battery unit, outputs of each bypass converter in parallel electrical communication with the shared bus, and each bypass converter estimates a battery state for each battery unit and controls the battery state to a reference state.

In one aspect of the embodiments, the reference state is based on a shared bus voltage.

In one aspect of the embodiments, each bypass converter further modifies the reference state using an objective map based on a parameter mismatch between one or more battery units.

In one aspect of the embodiments, modifying the reference state reduces a rate of divergence of the parameter mismatch.

In one aspect of the embodiments, the objective map is embodied in one of one or more bypass converters and the central controller.

In one aspect of the embodiments, the reference state further is modified in response to a bypass converter input current and a droop resistance.

In one aspect of the embodiments, the battery state comprises a unit state-of-charge and the parameter mismatch is a capacity mismatch between a unit capacity of the given battery unit and one of a unit capacity of a maximum capacity battery unit, an average unit capacity of the plurality of battery units, and a predefined unit capacity, such that a battery unit with a higher unit capacity reaches a higher maximum unit state-of-charge than a battery unit with a lower unit capacity.

In one aspect of the embodiments, the battery state comprises a unit state-of-charge and the parameter mismatch is a unit capacity mismatch between a unit capacity of the given battery unit and one of a unit capacity of a maximum capacity battery unit, an average unit capacity, and a predefined unit capacity if the unit state-of-charge exceeds a control threshold and the parameter mismatch is a unit resistance mismatch between a unit resistance of the given battery unit and one of an average unit resistance for the plurality of battery units, a unit resistance of a maximum resistance battery unit, and a predefined unit resistance if the unit state-of-charge is less than the control threshold.

In one aspect of the embodiments, the apparatus further comprising a battery charger connected in parallel electrical communication to the plurality of battery units, and in communication with any one of a central controller, the shared bus, and the plurality of bypass converters, and wherein the battery charger modifies the charging current based on the communications.

In one aspect of the embodiments, the apparatus further comprising a capacitor in parallel electrical communication with the shared bus.

In one aspect of the embodiments, an apparatus comprises a shared bus, a plurality of battery units, a plurality of isolated direct current (DC) to DC bypass converters, each bypass converter associated with one battery unit of the plurality of battery units and inputs of each bypass converter in parallel electrical communication with the associated battery unit, outputs of each bypass converter in parallel electrical communication with the shared bus, and a central controller that estimates a battery state for each battery unit and controls the battery state to a reference state using the bypass converters of each battery unit In one aspect of the embodiments, a droop controller is embodied in one of one or more bypass converters and the central controller.

FIG. 1 is a schematic block diagram illustrating one embodiment of a battery controller 111. The battery controller 111 may control a battery system. The battery controller 111 may be embodied in semiconductor circuits, a processor, a computer readable storage medium, or combinations thereof. The battery controller 111 may include a state estimator 112, an objective map 114, a summing function 117, and a DC-DC controller 118. In addition, the battery controller 111 may include a droop control 116.

The state estimator 112 may receive one or more state inputs 124 from one or more battery units. The state inputs 124 may include one or more of a unit voltage, a unit current, and a unit temperature. The state estimator 112 may generate one or more state estimate 132 for the one or more battery units including a unit state-of-charge, a unit state of discharge, a unit capacity, a unit state-of-health, a unit resistance, the unit impedance, and/or unit power capability. For example, the state estimator 112 may generate an open circuit unit voltage.

The objective map 114 may receive the state estimate 132 and one or more parameter mismatches 126. The parameter mismatch 126 may specify between parameters of 2 or more battery states. The objective map 114 may generate a shared bus reference voltage 134. In one embodiment, the shared bus reference voltage 134 is a bus reference voltage as will be described hereafter. The objective map 114 may control a battery unit using the control input 134.

The droop control 116 may receive the control input 134 and one or more droop inputs 128. The droop inputs 128 may include an input current to a bypass converter and a droop control resistance. The droop control 116 may generate a modified shared bus reference voltage 136. The modified shared bus reference voltage 136 may facilitate the sharing of a load current between one or more bypass converters.

The summing function 117 may receive a shared bus voltage 145 that will be described hereafter. In addition, the summing function 117 may receive one of the shared bus reference voltage 134 and the modified shared bus reference voltage 136. The summing function 117 may subtract the shared bus voltage 145 from the shared bus reference voltage 134 or the modified shared bus reference voltage 136 to generate a control signal 138.

The DC-DC controller 118 may receive the control signal 138 and generate one or more DC-DC controls 210 that could control a DC-DC converter as will be described hereafter.

In one embodiment, the functions of the battery controller 111 are distributed among one or more bypass converters. Alternatively, the functions of the battery controller 111 may be performed by a central controller. In addition, the functions of the battery controller 111 may be distributed among the one or more bypass converters and the central controller.

Figure 2A:
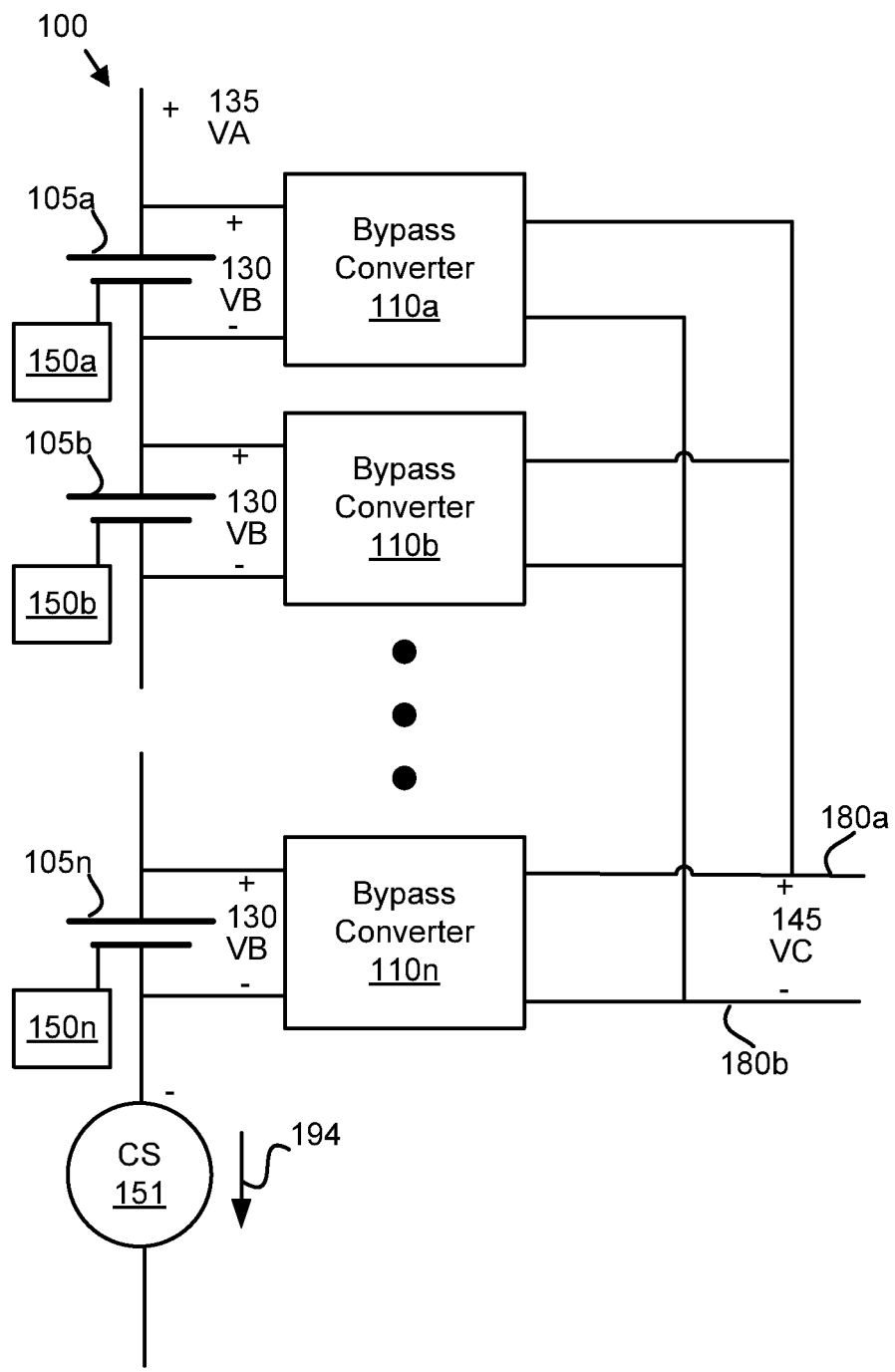
FIG. 2A is a schematic block diagram illustrating one embodiment of a battery system.

FIG. 2A is a schematic block diagram illustrating one embodiment of a battery system 100. The system 100 includes a plurality of battery units 105. Each battery unit 105 may include one or more cells in a series configuration, a parallel configuration, or combinations thereof. In the depicted embodiment, the battery units 105 are arranged in series electrical communication. Each battery unit 105 is in parallel electrical communication with inputs of a bypass converter 110. The bypass converter 110 is described in greater detail hereafter. Outputs of each bypass converter 110 are in parallel communication with a shared bus 180. In the depicted embodiment, the shared bus 180 includes positive 180*a* and negative 180*b* conductors. The shared bus 180 may have a shared bus voltage 145.

A battery sensor 150 is connected to each battery unit 105. The battery sensor 150 may include at least one of a temperature sensor, an optical sensor, a voltage sensor, a current sensor, a pH sensor, a strain sensor, a pressure sensor, and a gas composition sensor. The battery sensor 150 may measure a unit voltage 130 for the battery unit 105. In addition, the battery sensor 150 may measure one or more of a unit impedance, a unit current, a minimum unit voltage, a maximum unit voltage, a unit temperature, the unit power capability, and the like for the battery unit 105.

In one embodiment, the plurality of battery units 105 forms a battery pack. The plurality of battery units 105 may have a series voltage VA 135. In addition, a current sensor CS 151 may sense a string current 194 of the series connection of the plurality of battery units 105.

Each bypass converter 110 may determine a battery state for the associated battery unit 105. The battery state was referred to as battery state in the predecessor provisional application. The bypass converter 110 may control the battery unit 105 to the battery state during charging and discharging of the battery unit 105. In addition, the battery controller 111 and/or each bypass converter 110 may decrease a rate of divergence of the battery state from a reference state as will be described hereafter. The reference state represents an objective battery state for the plurality of battery units 105. The battery states are managed over a longer divergence time interval to decrease a rate of divergence from the reference state. In one embodiment, the battery states are converged to the reference state. Alternatively, the divergence of the battery states from the reference state may be minimized.

The battery state may be at least one of battery state comprising a control signal, a state-of-charge, a state-of-discharge, a capacity, a state-of-health, a unit impedance, a unit voltage 130, a unit current, a minimum unit voltage, a maximum unit voltage, a unit temperature, a unit power capability, a unit history, a unit electrochemical model parameter, and a unit life-prognostic model parameter. The reference state may be at least one of reference state parameters comprising a reference state-of-charge, a reference state-of-discharge, a reference capacity, a reference state-of-health, a reference unit impedance, a reference unit voltage, a reference unit current, a reference minimum unit voltage, a reference maximum unit voltage, a reference unit temperature, a reference power capability, a reference unit history, a reference unit electrochemical model, and a reference unit life-prognostic model.

Figure 2B:
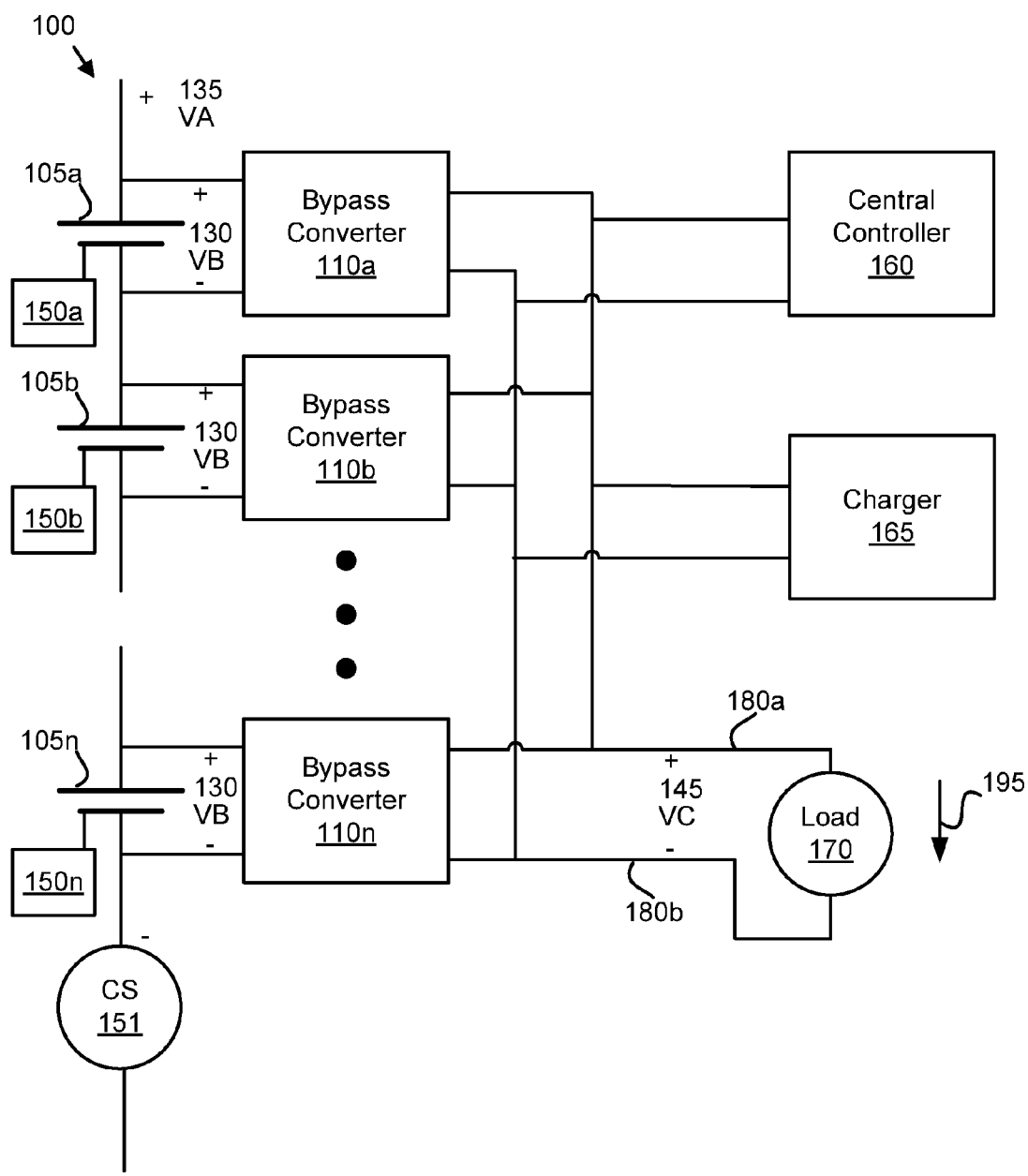
FIG. 2B is a schematic block diagram illustrating one alternate embodiment of a battery system.

FIG. 2B is a schematic block diagram illustrating one alternate embodiment of the battery system 100. In the depicted embodiment, a load 170 is electrical communication with the shared bus 180. In addition, a central controller 160 and a charger 165 are also in electrical communication with the shared bus 180.

The central controller 160 may sense the shared bus voltage 145 of the shared bus 180. In one embodiment, the central controller 160 is in communication with the bypass converters 110. In addition, the central controller may be in communication with the current sensor 151. In one embodiment, the central controller 160 may modify the reference state for the battery units 105. For example, the reference state may be the shared bus voltage 145 and the central controller 160 may modify the shared bus voltage 145. Alternatively, the central controller 160 may communicate a control signal to the plurality of bypass converters 110. The control signal may modify the battery state for the battery units 105.

The battery charger 165 is connected in electrical communication with the shared bus 180. In an alternative embodiment, the battery charger 165 is in parallel electrical communication to the series connected plurality of battery units 105. The battery charger 165 may charge the battery units 105 by supplying power from an external power supply to the shared bus 180.

In one embodiment, the battery charger 165 is in communication with at least one of the central controller 160, the shared bus 180, and the plurality of bypass converters 110. The battery charger 165 may modify the charging current based on the communications with the central controller 160, the shared bus 180, and/or the plurality of bypass converters 110.

Figure 2C:
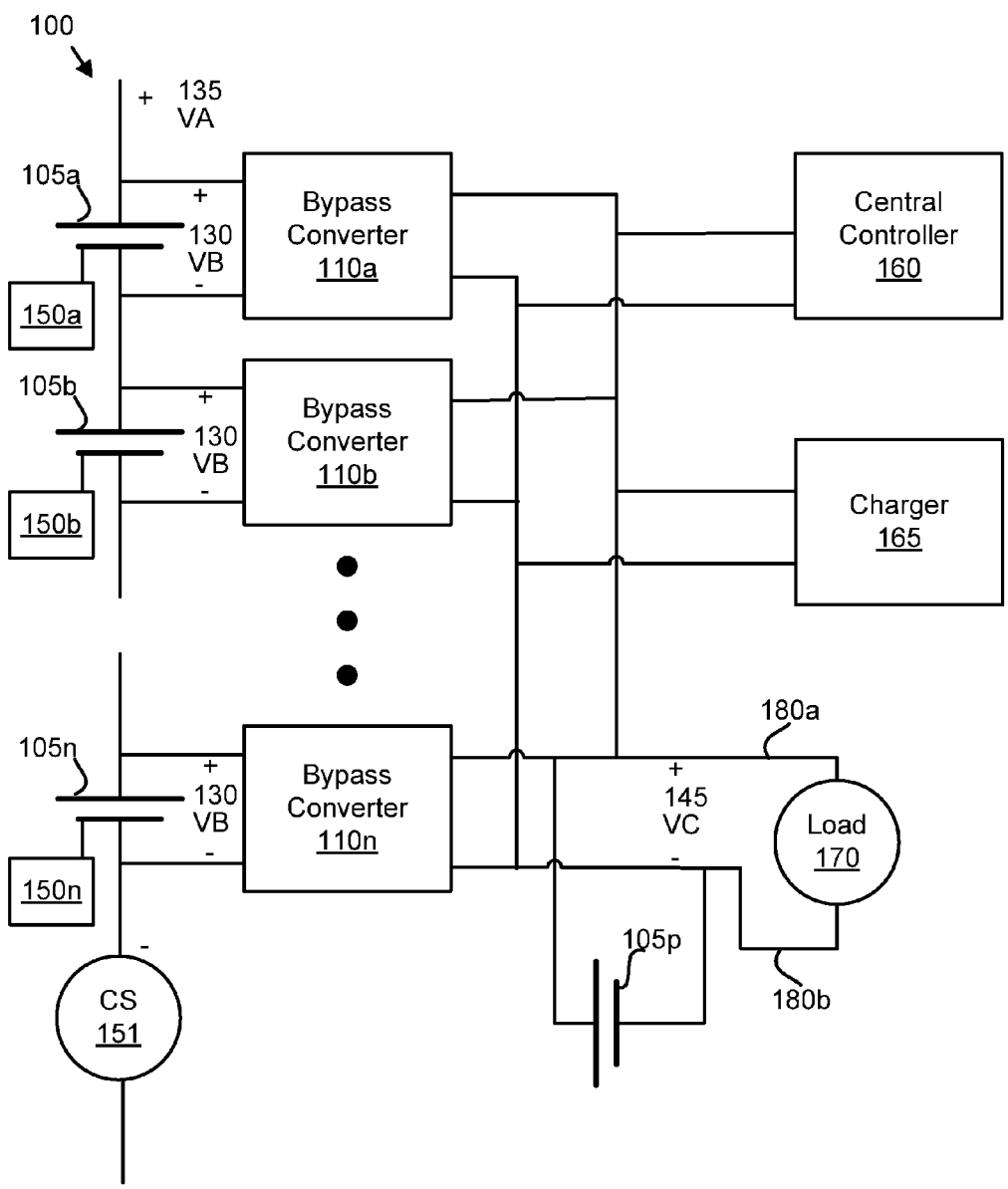
FIG. 2C is a schematic block diagram illustrating one alternate embodiment of a battery system.

FIG. 2C is a schematic block diagram illustrating one alternate embodiment of the battery system 100. In the depicted embodiment, a battery unit 105p is in parallel electrical communication with the shared bus 180. In a certain embodiment, the battery unit 105p drives the shared bus voltage 145.

Figure 2D:
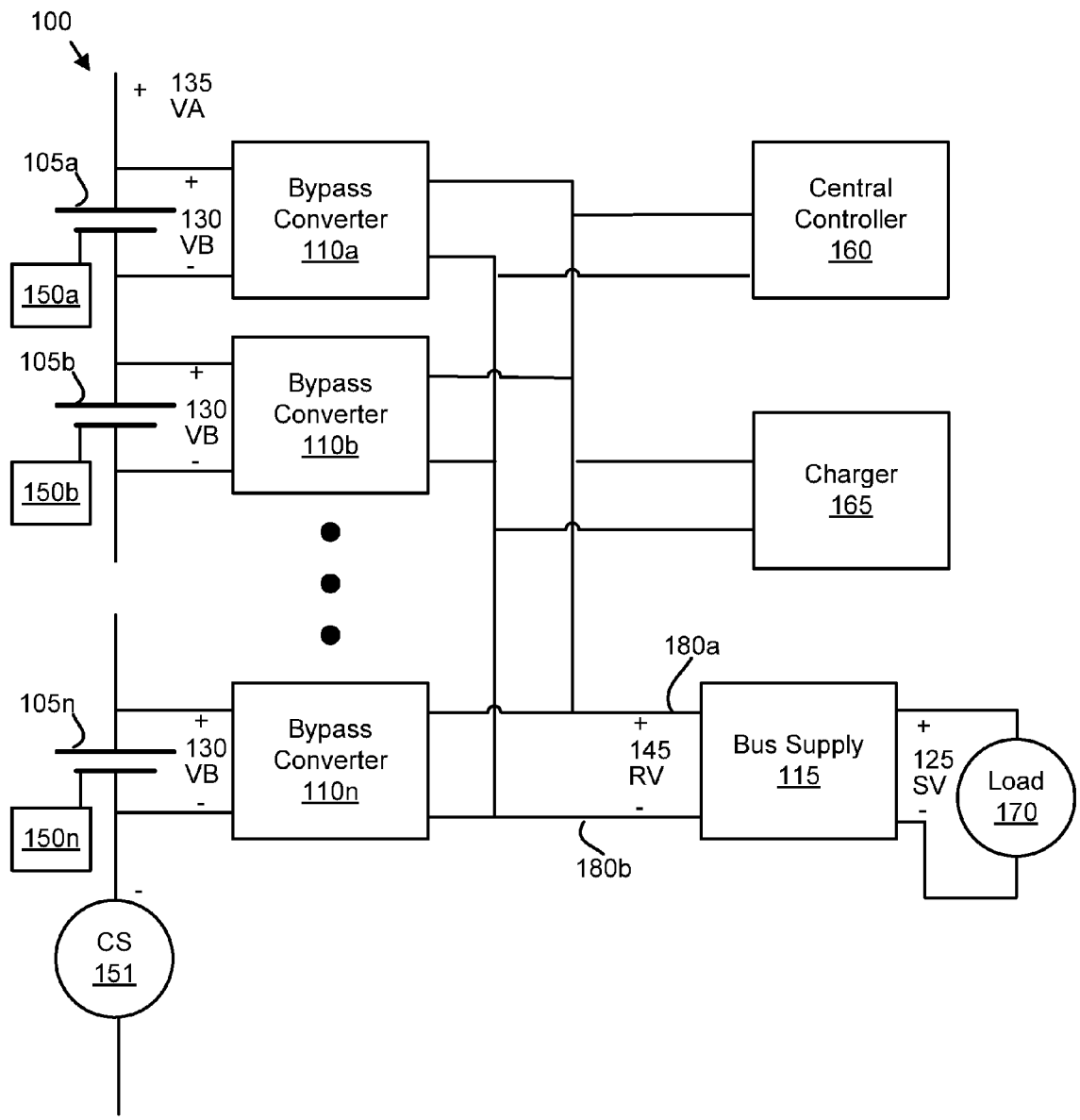
FIG. 2D is a schematic block diagram illustrating one alternate embodiment of a battery system.

FIG. 2D is a schematic block diagram illustrating one alternate embodiment of the battery system 100. In the depicted embodiment, the shared bus 180 is in electrical communication with the bus supply 115. The bus supply 115 may be a DC to DC converter. In one embodiment, the bus supply 115 provides a supply voltage 125 and a supply current 195. The supply current 195 may drive the load 170.

In one embodiment, the bus supply 115 may provide an auxiliary power system such as a 12 Volt power supply. Alternatively, the bus supply 115 may provide high-voltage power.

Figure 2E:
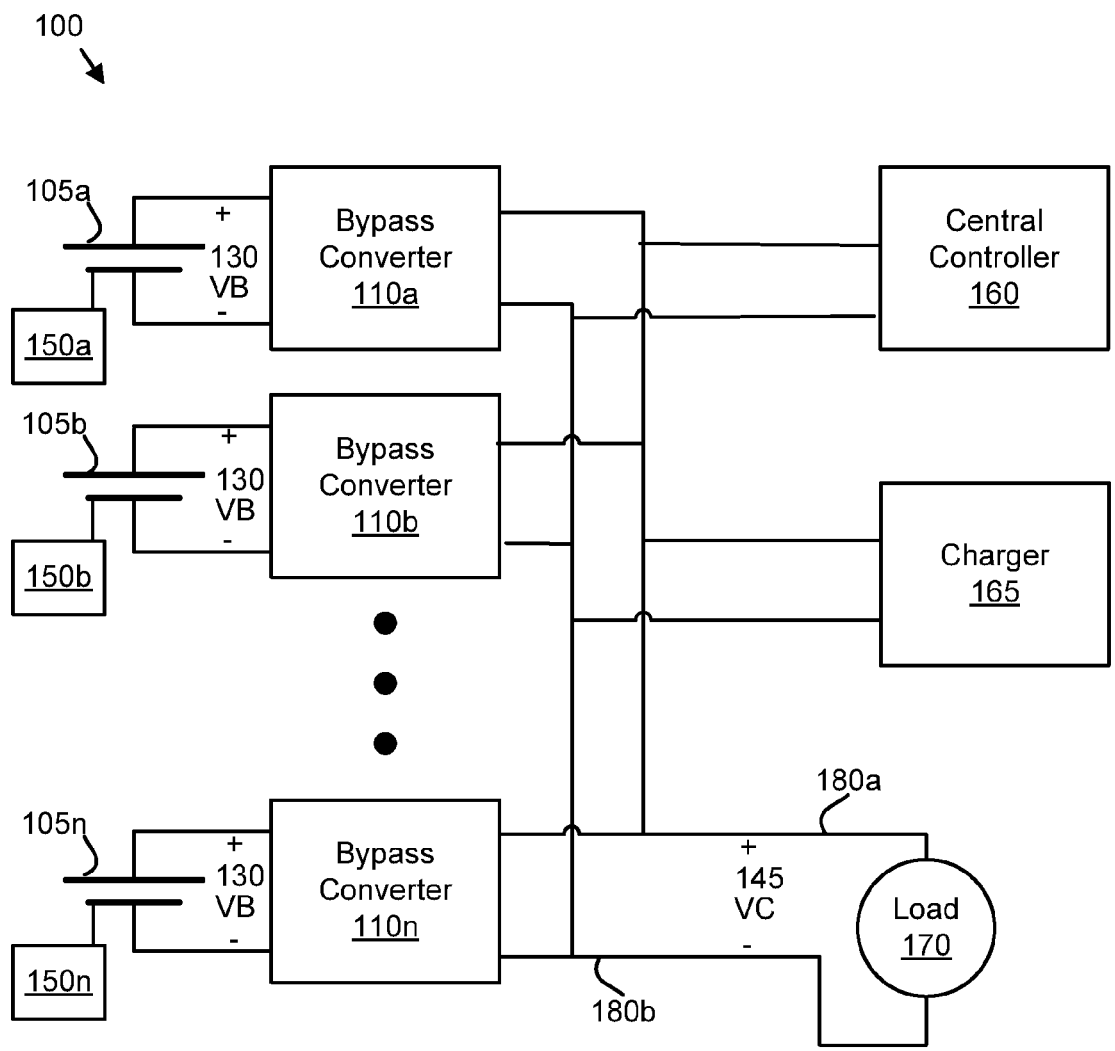
FIG. 2E is a schematic block diagram illustrating one alternate embodiment of a battery system.

FIG. 2E is a schematic block diagram illustrating one alternate embodiment of the battery system 100. In the depicted embodiment, the battery units 105 are not in series electrical communication. Instead, the shared bus 180 may provide power for the load 170.

Figure 2F:
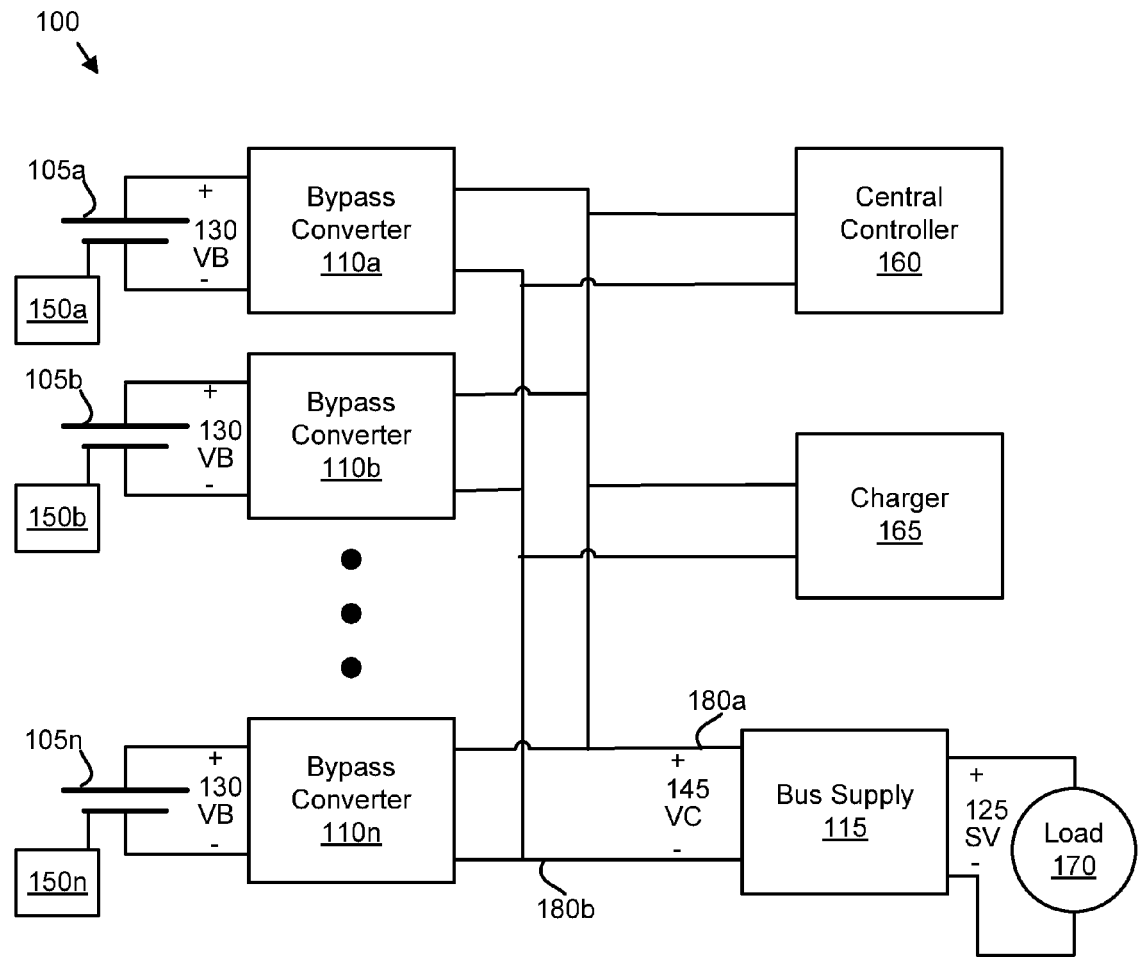
FIG. 2F is a schematic block diagram illustrating one alternate embodiment of a battery system.

FIG. 2F is a schematic block diagram illustrating one alternate embodiment of the battery system 100. As in FIG. 2E, the battery units 105 are not in series electrical communication. The shared bus 180 drives the bus supply 115 which provides power for the load 170. The bus supply 115 may be a DC to DC converter and may supply the load 170 at a supply voltage 125 that is greater than or less than the shared bus voltage 145.

Figure 2G:
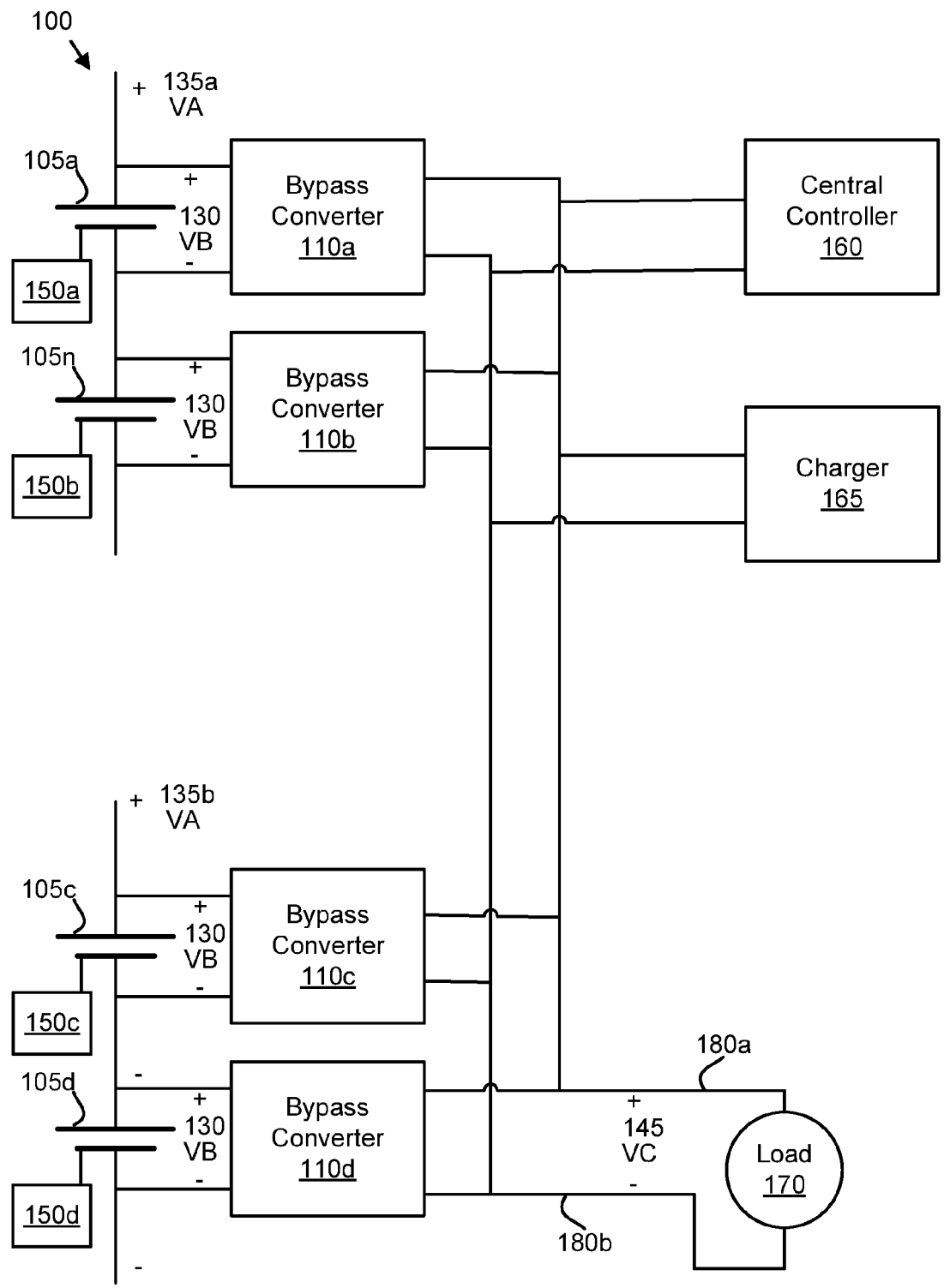
FIG. 2G is a schematic block diagram illustrating one alternate embodiment of a battery system.

FIG. 2G is a schematic block diagram illustrating one alternate embodiment of the battery system 100. In the depicted embodiment, a first plurality of battery units 105a-b are in series electrical communication while a second plurality of battery units 105c-d are also in series electrical communication but are not an electrical communication with the first plurality of battery units 105a-b. The bypass converters 110 associated with the first plurality of battery units 105a-b and the bypass converters 110 associated with a second plurality of battery units 105c-d are in electrical communication with the shared bus 180. As a result, the first plurality of battery units 105a-b may provide power independent of the second plurality of battery units 105c-d while the shared bus 180 provides power to the load 170.

Figure 2H:
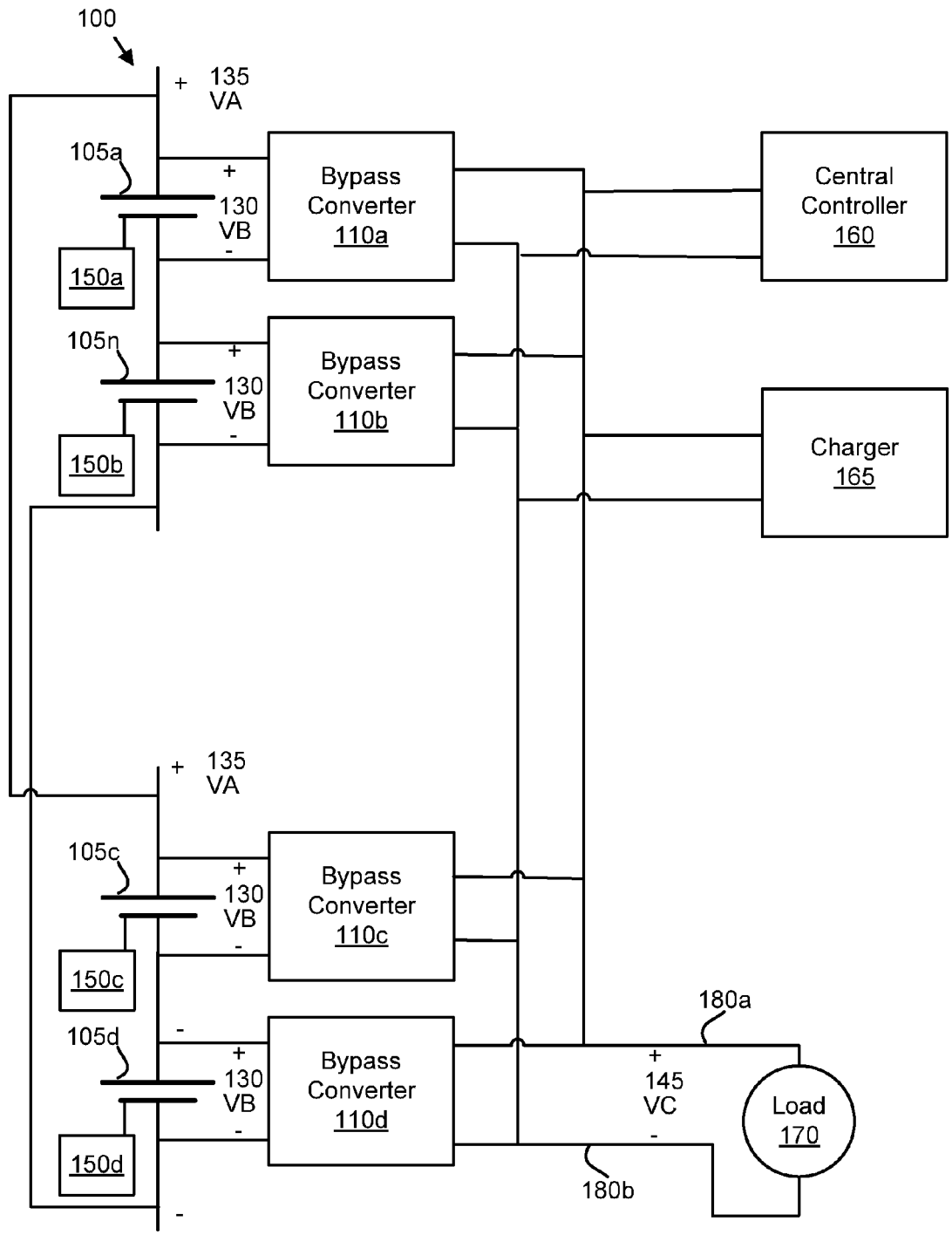
FIG. 2H is a schematic block diagram illustrating one alternate embodiment of a battery system.

FIG. 2H is a schematic block diagram illustrating one alternate embodiment of the battery system 100. The first plurality of battery units 105a-b and the second plurality of battery units 105c-d of FIG. 2G are depicted in parallel electrical communication.

Figure 2I:
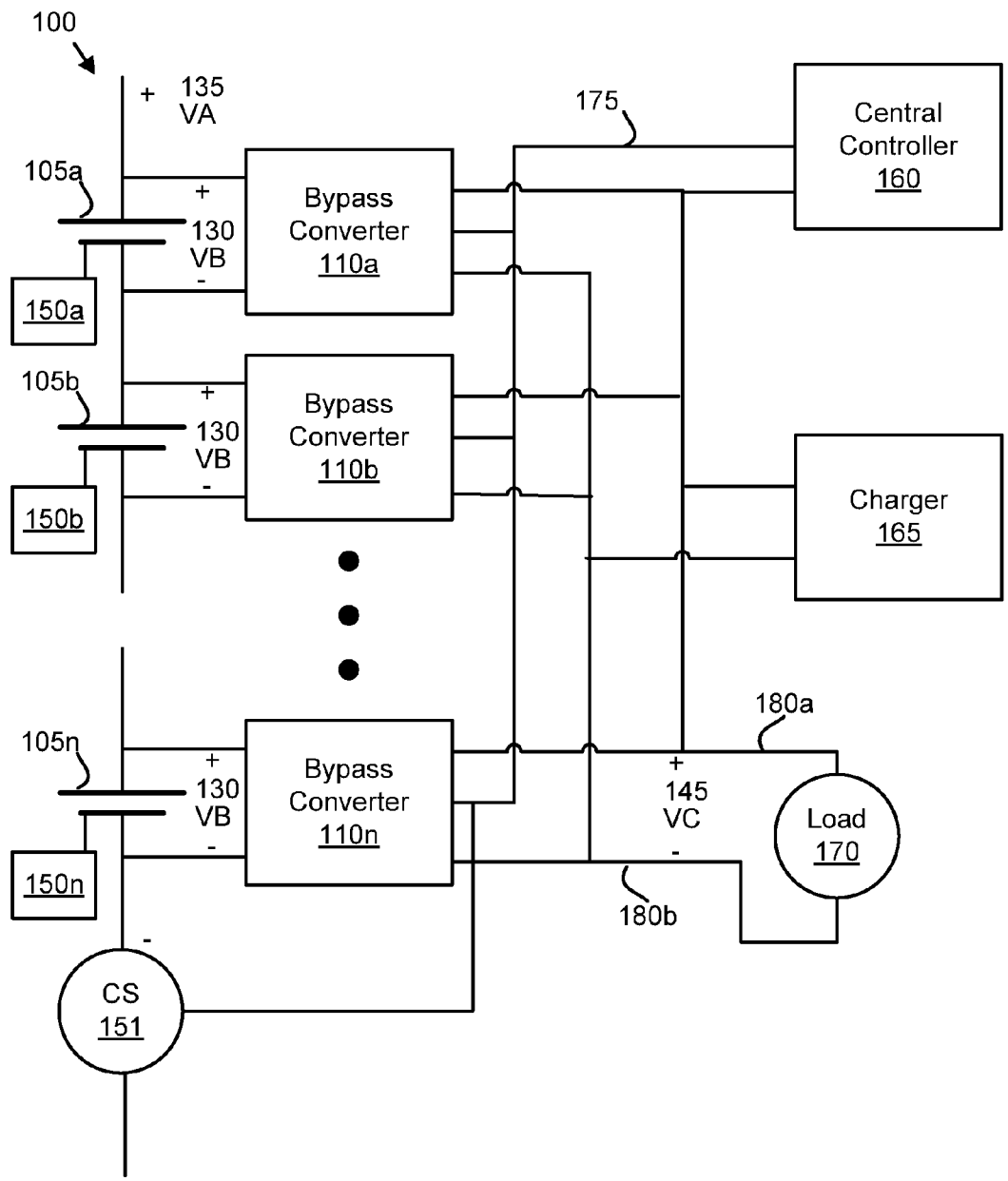
FIG. 2I is a schematic block diagram illustrating one alternate embodiment of a battery system.

FIG. 2I is a schematic block diagram illustrating one alternate embodiment of the battery system 100. In the depicted embodiment, the central controller 160 communicates with the bypass converters 110 over a shared communications bus 175. The shared communications bus 175 may be an analog bus. Alternatively, the shared communications bus 175 may be a digital bus.

The current sensor 151 may also communicate with the bypass converters 110 over the shared communication bus 175. In an alternative embodiment, the shared communication bus 175 is not in communication with the central controller 160. In a certain embodiment, the current sensor 151 communicates with the bypass converters 110 over a dedicated bus such as an analog bus or a digital bus.

Figure 2J:
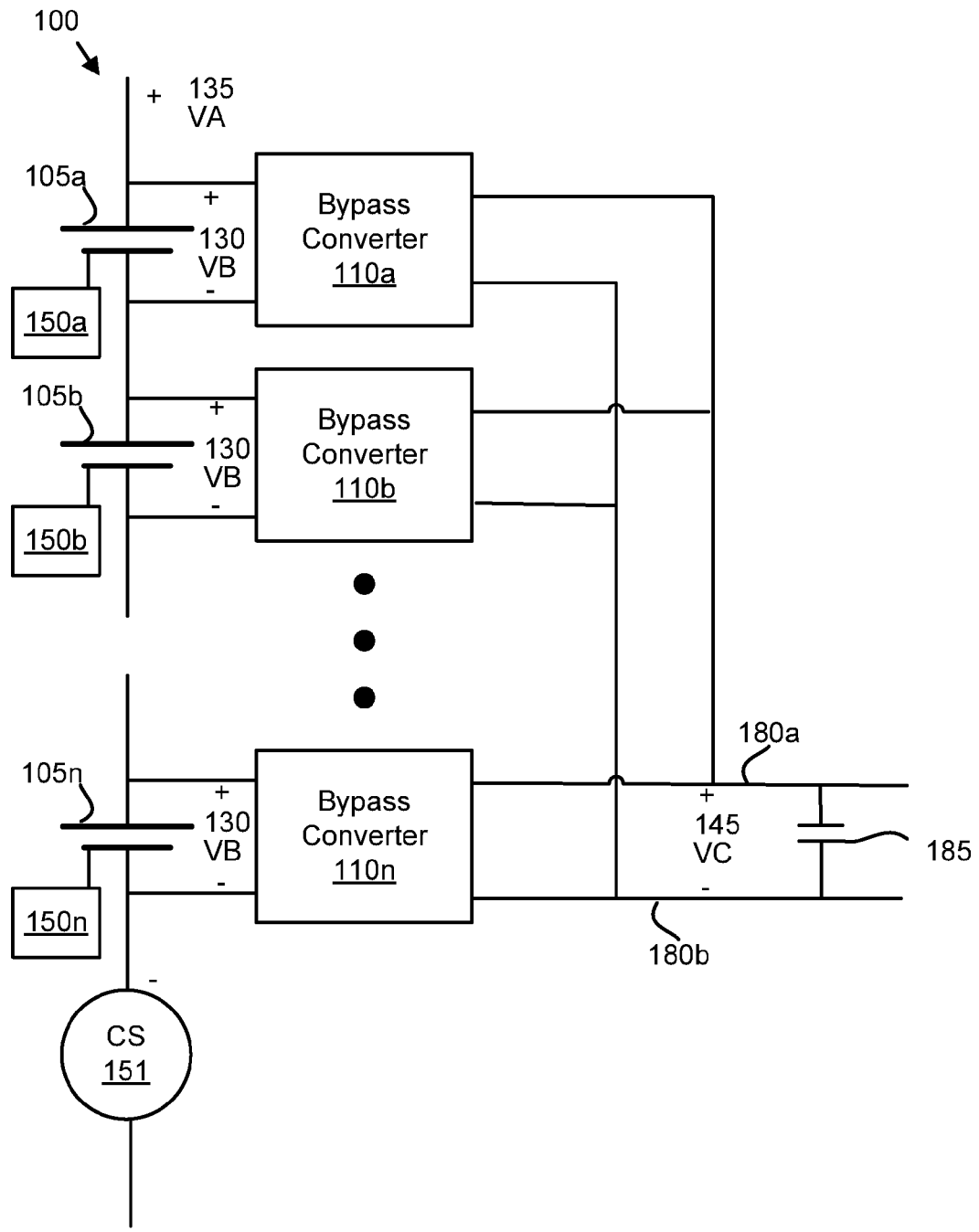
FIG. 2J is a schematic block diagram illustrating one alternate embodiment of a battery system.

FIG. 2J is a schematic block diagram illustrating one alternate embodiment of the battery system 100. In the depicted embodiment, a capacitor 185 is in parallel electrical communication with the shared bus 180.

Figure 2K:
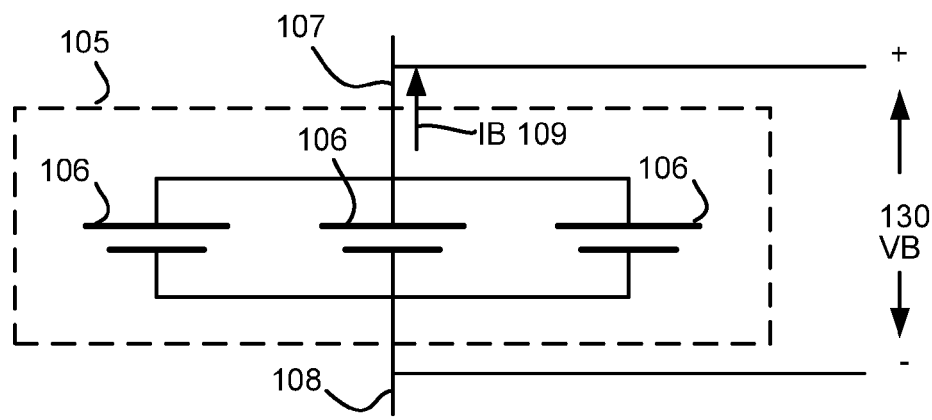
FIG. 2K is a schematic block diagram illustrating one embodiment of a battery unit.
Figure 2L:
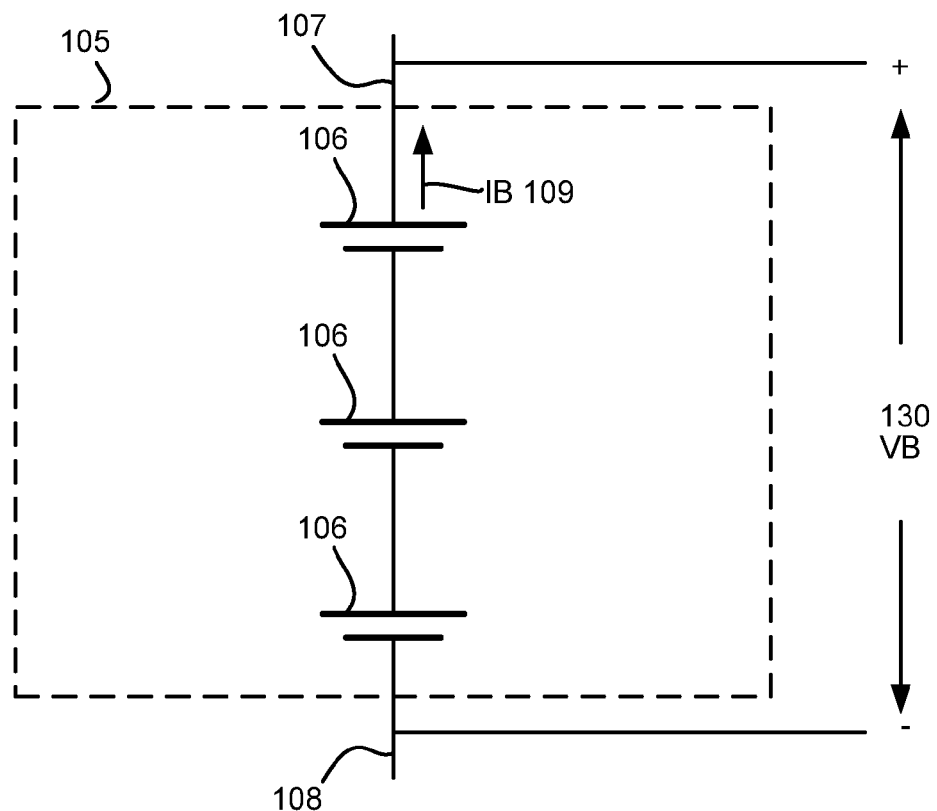
FIG. 2L is a schematic block diagram illustrating one alternate embodiment of a battery unit.
Figure 2M:
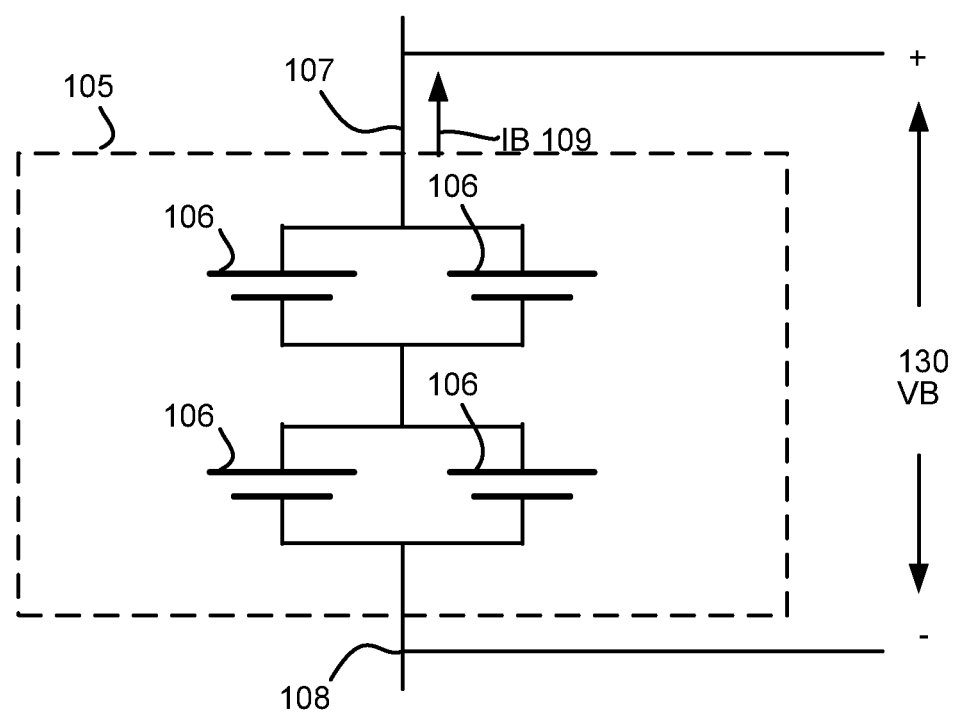
FIG. 2M is a schematic block diagram illustrating one alternate embodiment of a battery unit.

FIG. 2K is a schematic block diagram illustrating one embodiment of the battery unit 105. In the depicted embodiment, the battery unit 105 includes three battery cells 106 in parallel electrical communication. The battery unit 105 may include any number of battery cells 106 and that the battery cells 106 may be organized in multiple configurations. FIGS. 2K-M illustrate three configurations that are exemplary and not limiting.

The battery unit 105 includes a positive connector 107 and a negative connector 108. The positive connector 107 and the negative connector 108 may be in electrical communication with the bypass converter 110. The unit voltage 130 is the voltage between the positive connector 107 and the negative connector 108. The unit current 109 flows through the battery unit 105. The battery unit 105 also includes a unit impedance. In addition, the battery unit 105 may include a unit resistance. The unit resistance may be a series resistance. In addition, the unit resistance may include the resistance of the positive connector 107, the negative connector 108, and all other connections.

FIG. 2L is a schematic block diagram illustrating one alternate embodiment of a battery unit 105. In the depicted embodiment, three battery cells 106 are depicted in series electrical communication.

FIG. 2M is a schematic block diagram illustrating one alternate embodiment of a battery unit 105. In the depicted embodiment, pairs of battery cells 106 are in parallel electrical communication, while the pairs of battery cells 106 are in series electrical communication. One or more sets of parallel connected battery cells 106 may be in series electrical communication.

Figure 2N:
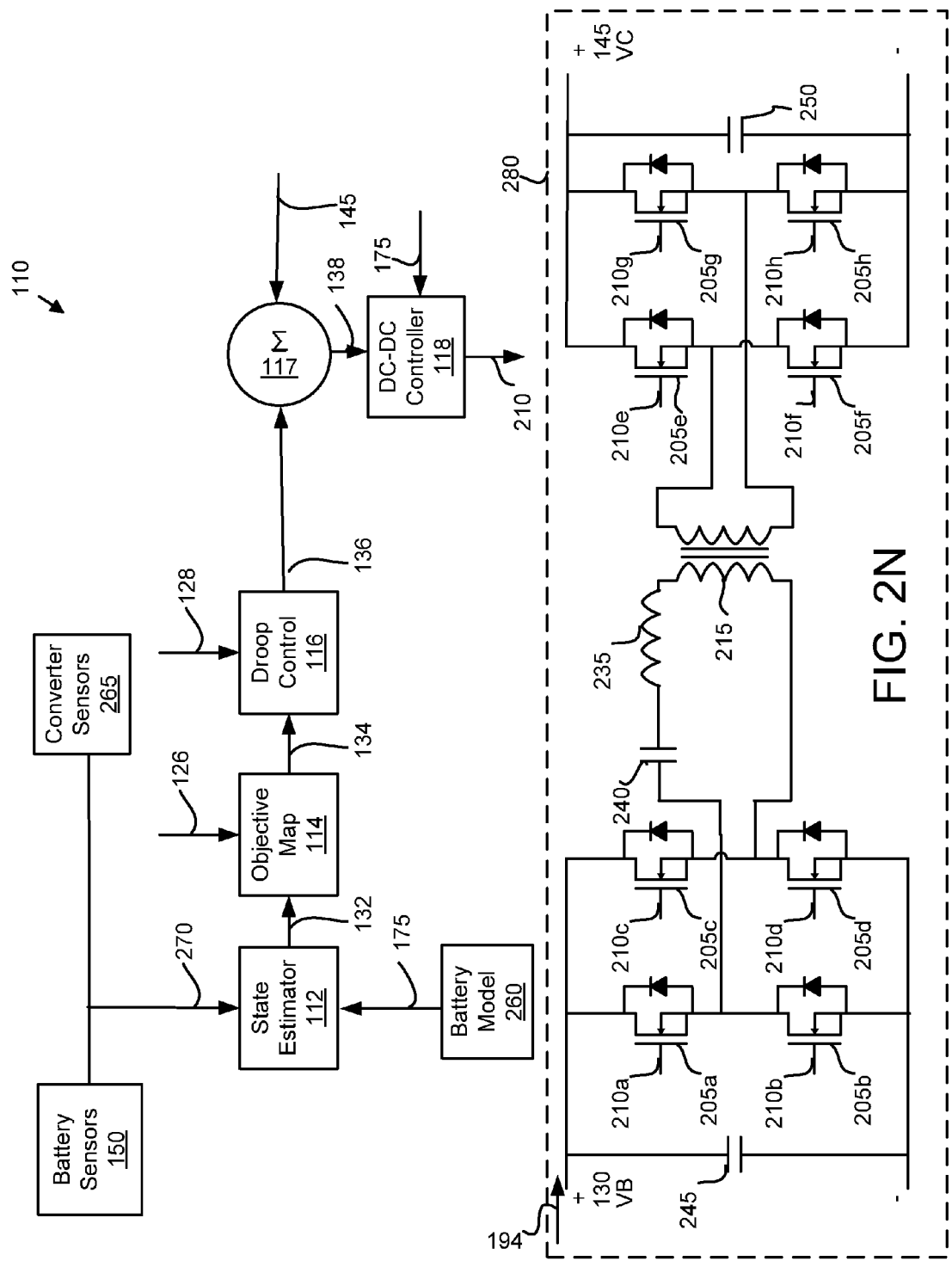
FIG. 2N is a schematic block diagram illustrating one embodiment of a bypass converter.

FIG. 2N is a schematic block diagram illustrating one embodiment of the bypass converter 110. In the depicted embodiment, the bypass converter 110 may provide distributed control of a battery unit 105. For distributed control, the bypass converter 110 includes the battery sensors 150, a battery model 260, converter sensors 265, a DC-DC controller 118, and a direct current (DC) to DC converter 280. The bypass converter receives a bypass converter input current 194 from the battery unit 105.

The state estimator 112 may receive inputs 270 such as the shared bus reference voltage 124 from the battery sensors 150 and/or the converter sensors 265. In the depicted embodiment, the DC to DC to converter 280 is a dual active bridge converter. In alternative embodiments, the DC to DC converter 280 may be a half bridge converter, a flyback converter, or a switched capacitor converter. Other configurations of DC to DC converter 280 may be employed.

In the depicted embodiment, the DC to DC converter 280 includes a plurality of switches 205, an inductor 235, and a transformer 215. In addition, the DC to DC converter 280 may include one or more capacitors 240, 245, 250. In one embodiment, each switch 205 comprises a field effect transistor and the diode. The DC-DC controller 118DC-DC controller 118 may control the switches 205 employing at least one of duty cycle control, frequency control, and phase shift control.

The battery model 260 may be a mathematical representation of one or more cells of the battery unit 105. In one embodiment, the battery model 260 comprises an equivalent circuit representation of the battery unit 105. Alternatively, the battery model 260 may comprise an electrochemical representation of the cells of the battery unit 105. The battery model 260 may receive state inputs 124 from the battery sensors 150. The battery model 260 may be updated based on the state inputs 124. In addition, the battery model 260 may receive commands and/or inputs from the central controller 160 over the shared communications bus 175. The battery model 260 may be used by the state estimator 112.

In one embodiment, the battery model 260 comprises reduced-order electrochemical state estimation of internal battery processes for the battery unit 105. The battery model 260 may determine the battery state response to inputs from the battery sensor 150 of the battery unit 105. The battery model 260 may estimate properties of the battery unit 105.

The DC-DC controller 118 may generate the DC-DC controls 210 that drive the switches 205 to control the output of the battery unit 105.

Figure 2O:
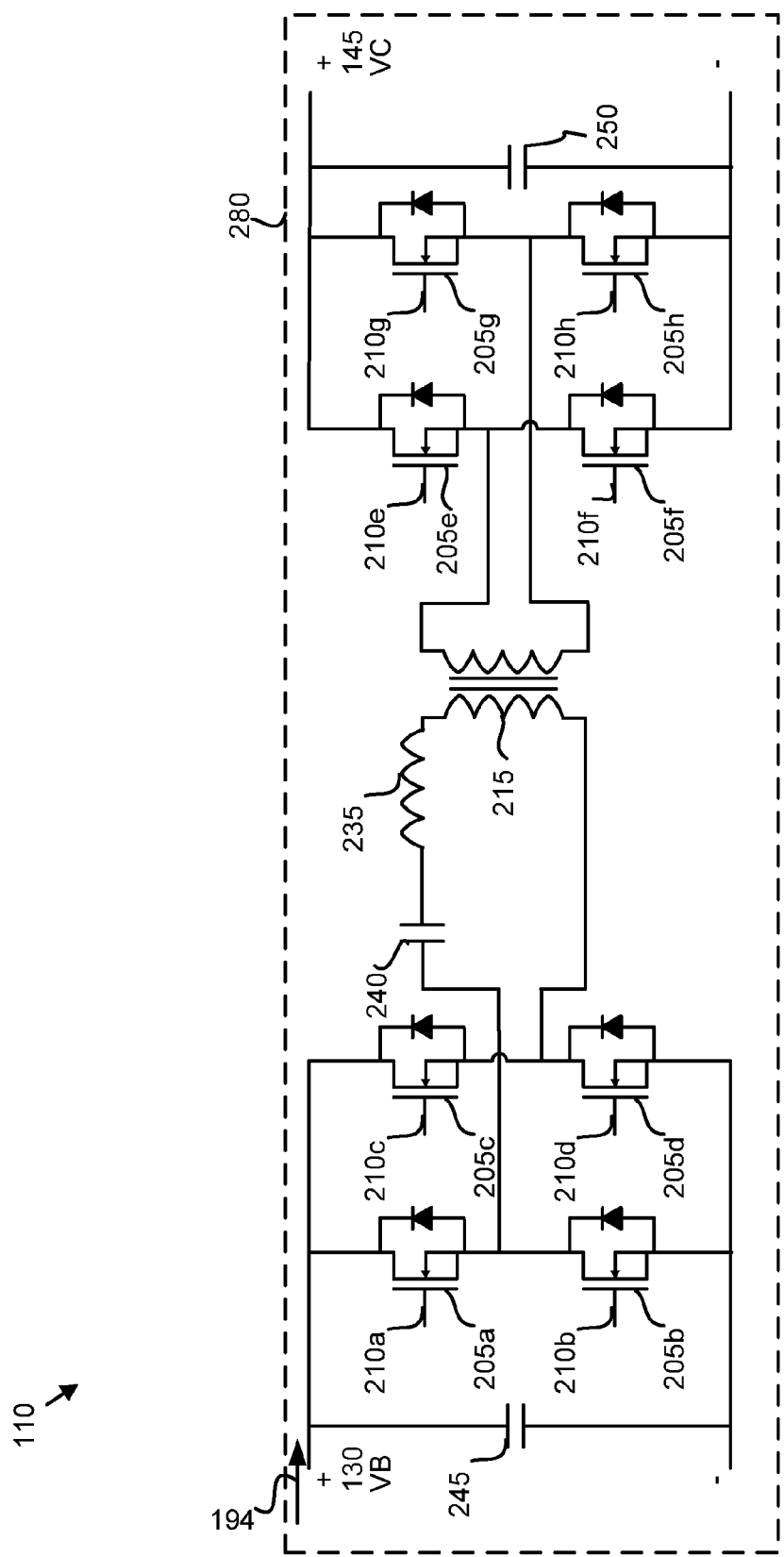
FIG. 2O is a schematic block diagram illustrating one alternate embodiment of a bypass converter.

FIG. 2O is a schematic block diagram illustrating one alternate embodiment of a bypass converter 110. Portions of the bypass converter 110 of FIG. 2N are shown. In the depicted embodiment, the central controller 160 controls the battery units 105 by generating the DC-DC controls 210 for the bypass converter 110.

Figure 3A:
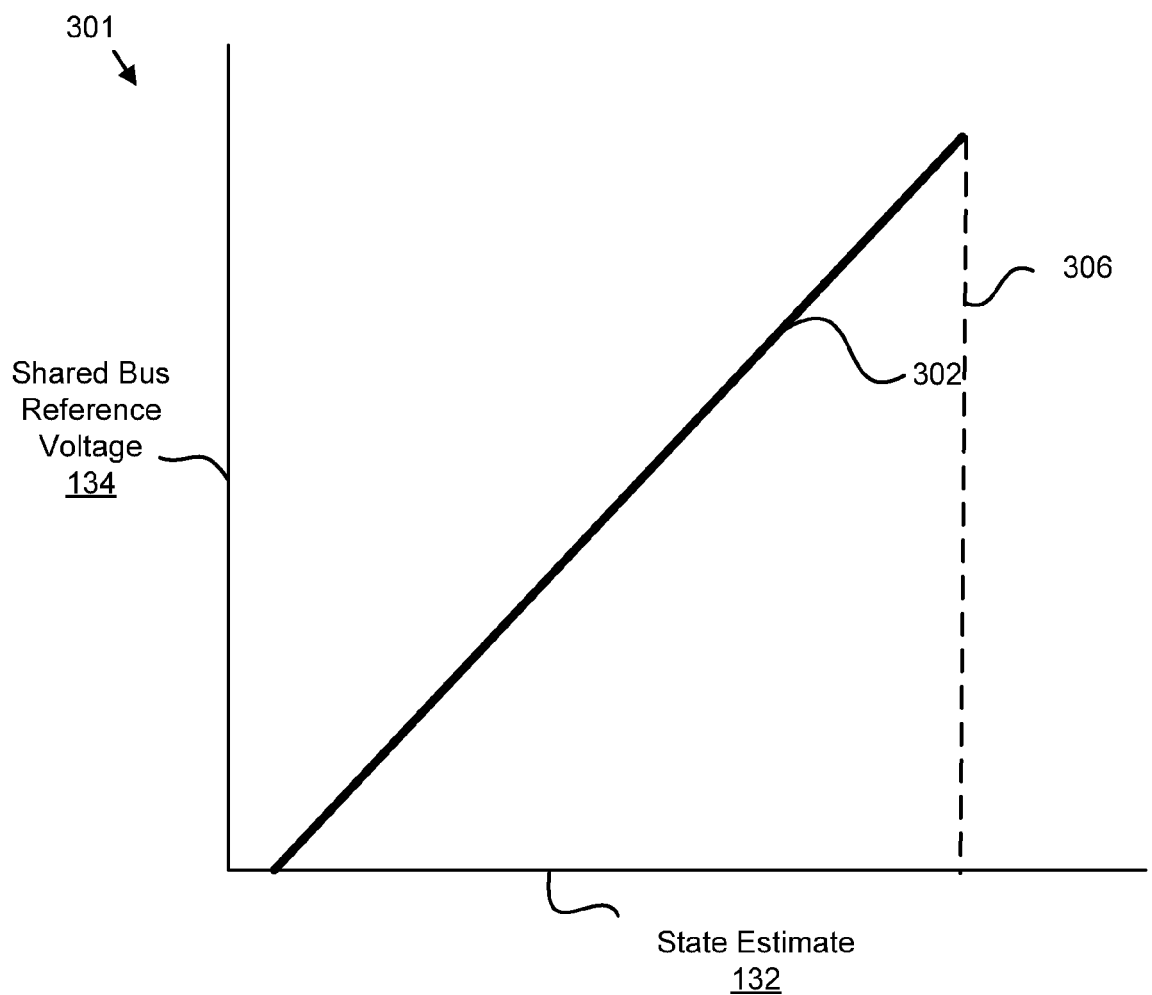
FIG. 3A is a graph illustrating one embodiment of control objectives.

FIG. 3A is a graph 301 illustrating one embodiment of control objectives. The control objectives may be embodied in the objective map 114. The graph 301 shows relationship of shared bus reference voltage 134 and a state estimate 132. In one embodiment, the state estimate 132 is controlled to a control limit 302 during the charging and/or discharging of a battery unit 105. The control limit 302 does not exceed a maximum shared bus voltage 306. For example, while charging the battery unit 105, the shared bus reference voltage 134 may be controlled so the shared bus reference voltage 134 does not exceed the control limit 302.

Figure 3B:
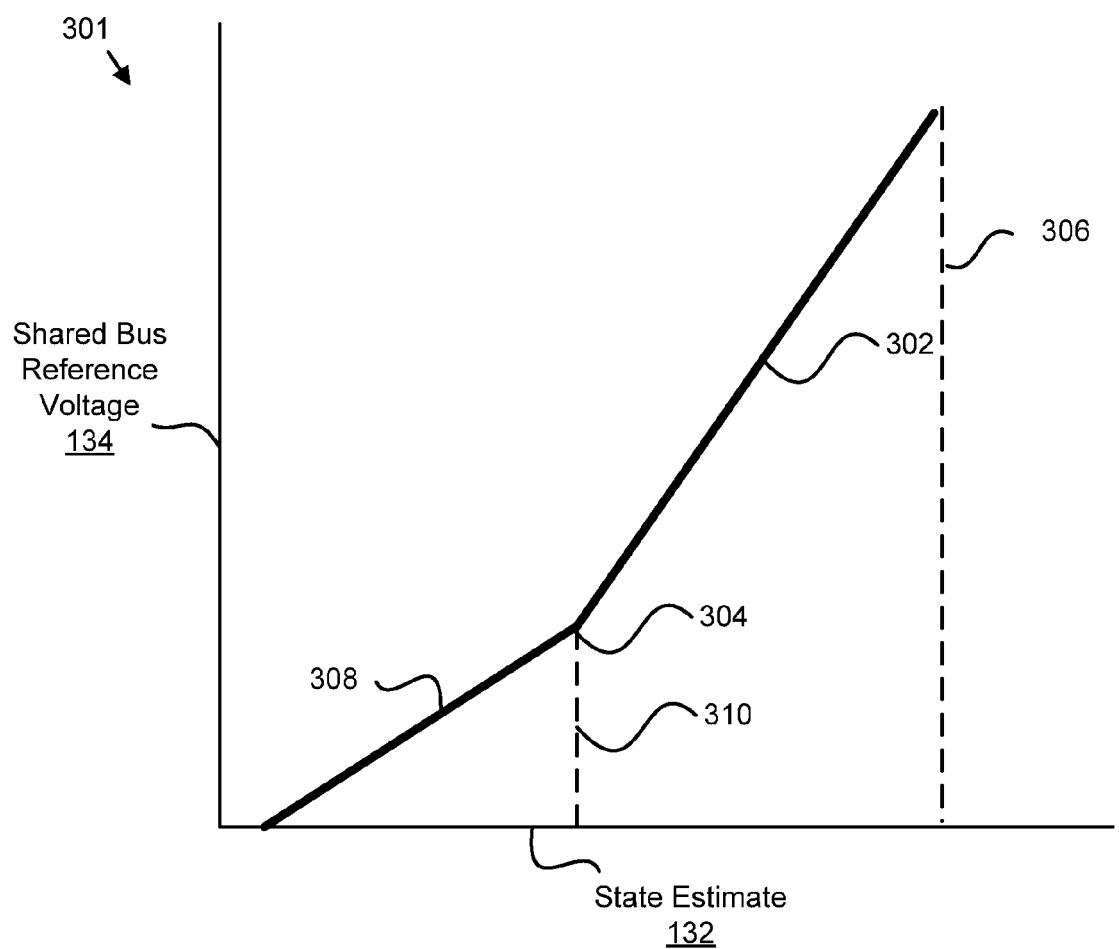
FIG. 3B is a graph illustrating one alternate embodiment of control objectives.

FIG. 3B is a graph 301 illustrating one alternate embodiment of control objectives. As in the graph 301 of FIG. 3A, relationship of shared bus reference voltage 134 and a state estimate 132. The control threshold 304 is also shown for a specified state estimate value 310. A lower control limit 308 is used for a state estimate 132 that is less than the control threshold 304 while an upper control limit 312 is used for state estimate 132 that is greater than the control threshold 304.

Figure 4A:
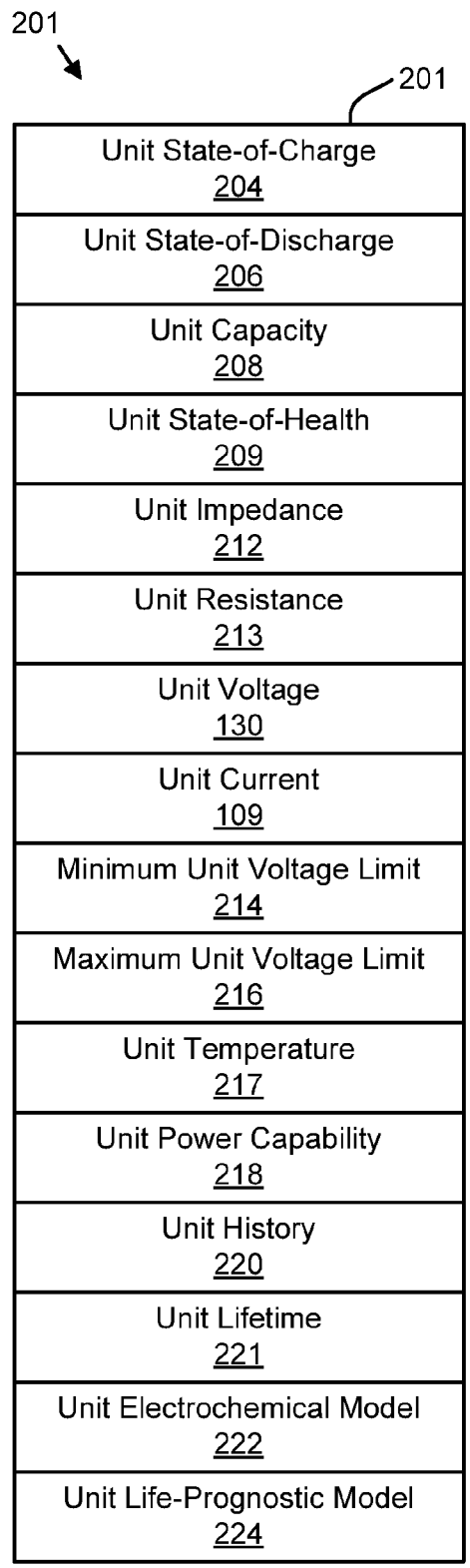
FIG. 4A is a schematic block diagram illustrating one embodiment of battery state data.

FIG. 4A is a schematic block diagram illustrating one embodiment of battery state data 201. The battery state data 200 maybe organized as a data structure in a memory. The battery state data 200 may be stored in the DC-DC controller 118, the central controller 160, or combinations thereof. In the depicted embodiment, the battery state data 200 includes a battery state 201 comprising the unit state-of-charge 204, the unit state-of-discharge 206, the unit capacity 208, the unit state-of-health 209, the unit impedance 212, the unit voltage 130, the unit current 109, the minimum unit voltage limit 214, the maximum unit voltage limit 216, the unit temperature 217, the unit power capability 218, the unit history 220, unit life time 221, the unit electrochemical model 222, and the unit life-prognostic model 224.

The unit state-of-charge 204 may measure a current charge of the battery unit 105. The unit capacity 208 may measure a maximum charge of the battery unit 105. The calculation of the unit state-of-charge 204 is described in FIG. 5E.

The unit state-of-discharge 206 may measure a discharge of the battery unit 105 from the unit capacity 208. The unit state-of-health 209 may describe one or more failure related parameters.

The unit impedance 212 may measure an internal impedance of the battery unit 105 and/or the battery unit connections. The unit impedance 212 may be measured during the characterization of the battery unit 105.

The unit resistance 213 may measure an internal resistance of the battery unit 105 and/or the battery unit connections. The unit resistance 213 may be measured during the characterization of the battery unit 105.

The unit voltage 130 may be an open circuit voltage for the batter unit 105. be measured by the battery sensors 150 as shown in FIG. 2A. The unit current 109 may be measured by the battery sensors 150 as shown in FIGS. 2K-M.

The minimum unit voltage limit 214 may be a minimum control limit of the unit voltage 130 of the battery unit 105. The maximum unit voltage limit 216 may a maximum control limit for the unit voltage 130.

The unit temperature 217 may measure an internal temperature of the battery unit 105. The unit temperature 217 may include a unit temperature distribution with the battery unit 105. Alternatively, the unit temperature 217 may measure an external temperature of the battery unit 105.

The unit power capability 218 may be calculated as a function of the unit voltage 130 and the unit current 109. The unit power capability 218 may be a current unit power capability 218 calculated for a point in time. Alternatively, the unit power capability 218 may be calculated for an extended time interval such as a discharge cycle.

The unit history 220 may record the battery state 201 at regular history intervals. For example, the unit history 220 may record the battery state 201 each 10 seconds. The unit electrochemical model 222 is described in more detail in FIG. 4D.

The unit life-prognostic model 224 may forecast the unit lifetime 221 of the battery unit 105. The lifetime may be calculated as a function of the battery state 201.

Figure 4B:
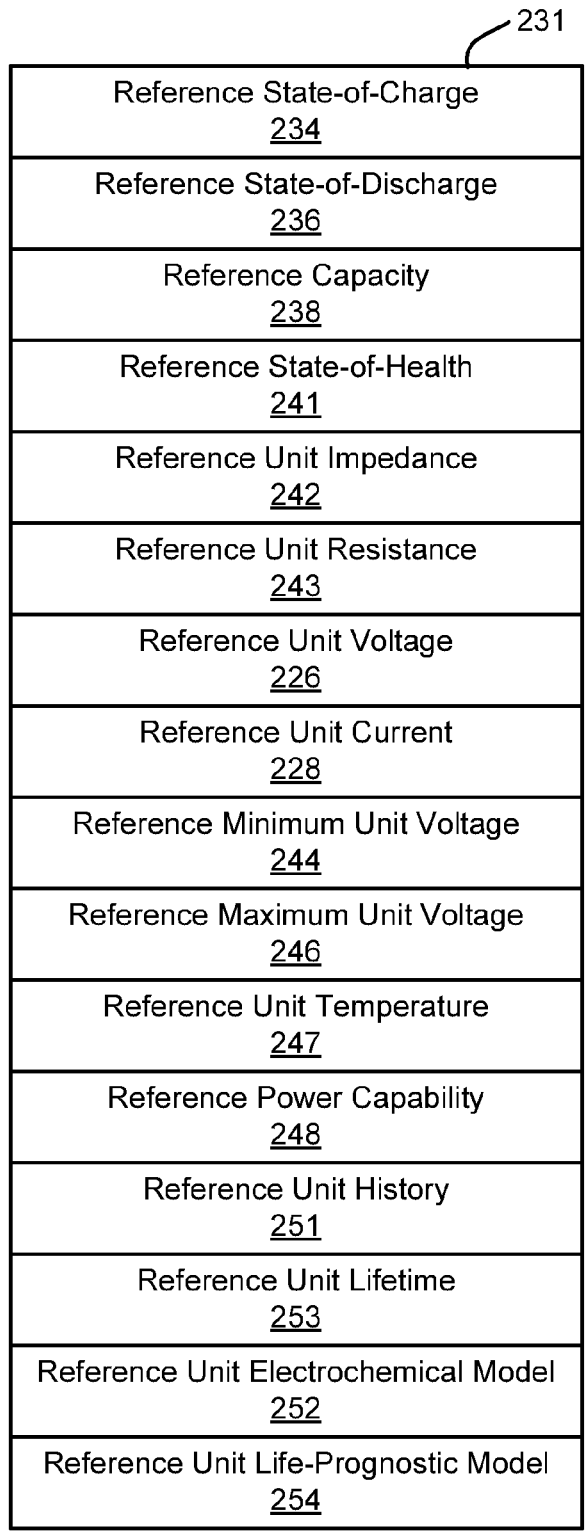
FIG. 4B is a schematic block diagram illustrating one embodiment of reference state data.

FIG. 4B is a schematic block diagram illustrating one embodiment of reference state data 229. The reference state data 229 maybe organized as a data structure in a memory. The reference state data 229 may be stored in the DC-DC controller 118, the central controller 160, or combinations thereof. In the depicted embodiment, the reference state data 229 includes the reference state 231 comprising the reference state-of-charge 234, the reference state-of-discharge 236, the reference capacity 238, the reference state-of-health 241, the reference unit impedance 242, the reference unit voltage 226, the reference unit current 228, the reference minimum unit voltage 244, the reference maximum unit voltage 246, the reference unit temperature 247, the reference power capability 248, the reference unit history 251, reference unit life time 253, the reference unit electrochemical model 252, and the reference unit life-prognostic model 254.

The reference state-of-charge 234, the reference state-of-discharge 236, the reference capacity 238, the reference state-of-health 241, the reference unit impedance 242, the reference unit voltage 226, the reference unit current 228, the reference minimum unit voltage 244, the reference maximum unit voltage 246, the reference unit temperature 247, the reference power capability 248, the reference unit history 251, the reference unit life time 253, the reference unit electrochemical model 252, and the reference unit life-prognostic model 254 are target parameters corresponding to the unit state-of-charge 204, the unit state-of-discharge 206, the unit capacity 208, the unit state-of-health 209, the unit impedance 212, the unit voltage 130, the unit current 109, the minimum unit voltage limit 214, the maximum unit voltage limit 216, the unit temperature 217, the unit power capability 218, the unit history 220, unit lifetime 221, the unit electrochemical model 222, and the unit life-prognostic model 224 respectively. The bypass converter 110 and/or central controller 160 may determine the reference state 231 for the one or more battery units 105 as will be described hereafter in FIG. 5C.

Figure 4C:
FIG. 4C is a schematic block diagram illustrating one embodiment of battery model data.

FIG. 4C is a schematic block diagram illustrating one embodiment of a battery model data 261. The battery model data 261 may be employed by the battery model 260. The battery model data 261 maybe organized as a data structure in a memory. The battery model data 261 may be stored in the DC-DC controller 118, the central controller 160, or combinations thereof. The battery model data 261 may be used to define a battery model for a battery unit 105. In the depicted embodiment the battery model data 261 includes optical data 262, the unit voltage 130, the unit current 109, pH data 264, strain data 266, pressure data 268, and gas composition data 270.

The battery model data 261 may be a Laguerre expansion of a discrete-time dynamic model. Alternatively, the battery model data 261 may be a continuous-time realization algorithm that performs a discrete-time realization algorithm in continuous time. The performed algorithm may be converted into a discrete domain.

In one embodiment, the battery model data 261 includes a reduced-order electrochemical state estimation of internal battery processes using the unit electrochemical model 222.

Figure 4D:
FIG. 4D is a schematic block diagram illustrating one embodiment of battery unit properties.

FIG. 4D is a schematic block diagram illustrating one embodiment of the unit electrochemical model 222. The unit electrochemical model 222 maybe organized as a data structure in a memory. The unit electrochemical model 222 may be stored in the DC-DC controller 118, the central controller 160, or combinations thereof. In the depicted embodiment, the unit electrochemical model 222 includes chemical properties 282, electrical properties 284, thermal properties 286, and physical properties 288.

The chemical properties 282 may include at least one of a formation of dendrites in the battery unit 105 and/or battery cells of the battery unit 105, a gas composition of the battery unit 105 and/or battery cells of the battery unit 105, a gas pressure of the battery unit 105 and/or battery cells of the battery unit 105, and a unit pH of the battery unit 105 and/or battery cells of the battery unit 105. The optical sensor may measure the formation of dendrites.

The electrical properties 284 may include at least one of the unit impedance, the unit capacity, and the unit voltage 130 of the battery unit 105. The thermal properties 286 may comprise one or more of the unit temperature 217 and a unit temperature distribution with the battery unit 105. The physical properties may include an expansion of the unit package for the battery pack.

Figure 4E:
FIG. 4E is a schematic block diagram illustrating one embodiment of control data.

FIG. 4E is a schematic block diagram illustrating one embodiment of control data 380. The control data 380 maybe organized as a data structure stored in a memory. The control data 380 includes a divergence time interval 382, the divergence limits 384, a control constant 386, a maximum shared bus voltage 306, a maximum supply current 390, a predefined unit capacity 392, a predefined nominal capacity 394, and a predefined unit resistance 396.

The divergence time interval 382 may specify a time interval for reducing the divergence of the battery state 201 relative to the reference state 231. The divergence time interval 382 may be a number of months and/or a lifetime of the battery system 100.

The divergence limits 384 may specify an acceptable divergence of the battery state 201 from the reference state 231. In one embodiment, the divergence limits 384 are specified for a plurality of time intervals and/or for a plurality of milestones.

The control constant 386 may control a rate of reducing the divergence of the battery state 201 from the reference state 231. In addition, the control constant 386 may control a rate of converging the battery state 201 to the reference state 231.

The maximum shared bus voltage 306 may specify a maximum for the shared bus voltage 145. The maximum supply current 390 may specify a maximum for the supply current 195. The predefined unit capacity 392 may specify a default value for a unit capacity 208. The predefined nominal capacity 394 may specify a default value for nominal unit capacity 208. The predefined unit resistance 396 may specify default value for unit resistance 213.

Figure 5A:
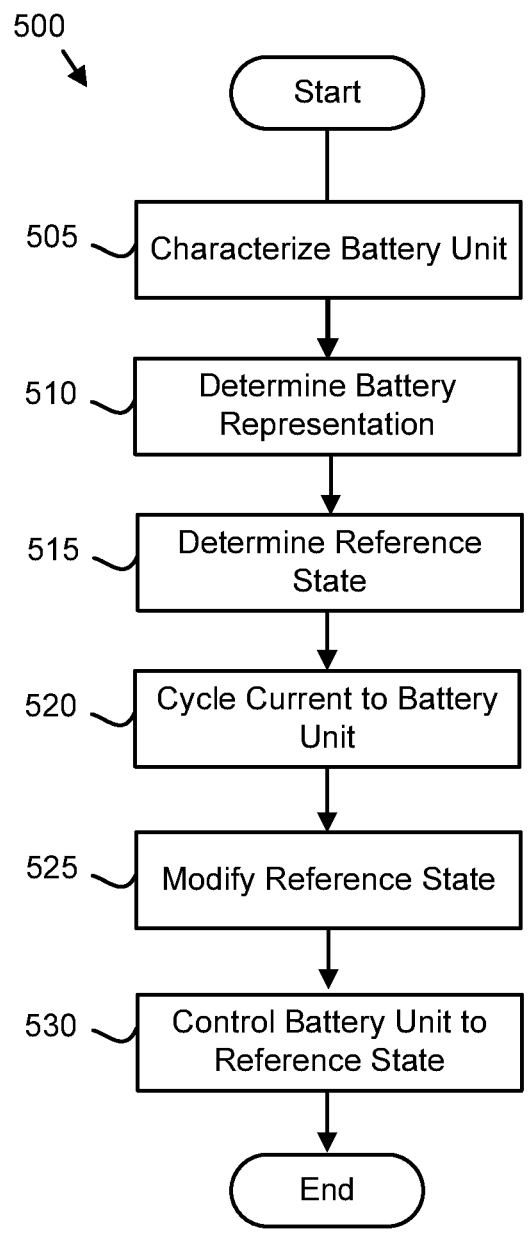
FIG. 5A is a schematic flow chart diagram illustrating one embodiment of a battery control method.

FIG. 5A is a schematic flow chart diagram illustrating one embodiment of a battery control method 500. The battery control method 500 may control a battery unit 105 of the battery system 100. The battery control method 500 may be performed by the battery controller 111. Alternatively, the method 500 may be performed by the central controller 160. In one embodiment, the battery control method 500 is performed by a combination of one or more bypass converters 110 and the central controller 160. In a certain embodiment, the method 500 is performed by a processor. In addition, the method 500 may be performed by computer readable storage medium storing code.

The method 500 starts, and in one embodiment, the battery controller 111 characterizes 505 the associated battery unit 105. The battery controller 111 may characterize the battery unit 105 in an off-line state. The characterization 505 is described in detail in FIG. 5E.

The battery controller 111 may determine 510 a battery state 201 for the associated battery unit 105. The battery state 201 may initially be determined 510 from the characterization 105 as described in FIG. 5E. In addition, the battery controller 111 may determine 510 a modified battery state 201 in order to manage the battery unit 105. For example, the battery controller 111 may modify the battery state 201 in order to reduce variability between the battery states 201 of the battery units 105, to extend the lifetime of the battery unit 105, to balance the lifetimes of one or more battery units 105, and to balance the power of one or more battery units 105.

In one embodiment, the battery state of each battery unit 105 may be determined 510 to increase the charging rate for some battery units 105 and reduce the charging rate for other battery units 105 to reduce the variability of the parameter mismatch among the battery units 105. The parameter mismatch 126 may be reduced over a target interval. The target interval may be a time interval such as three weeks. Alternatively, the target interval may be a number of charge/discharge cycles for the system 100. The determination 510 of the battery state 201 is described in more detail in FIG. 5B.

The battery controller 111 may determine 515 the reference state 231 for the associated battery unit 105. The determination 515 of the reference state is described in more detail in FIG. 5C.

The battery controller 111 may cycle 520 current to the associated battery unit 105 to heat the battery unit 105. The unit impedance 212 of the battery unit 105 may decrease as the battery unit 105 is heated. Reducing the unit impedance 212 of the battery unit 105 may improve the performance of the battery unit 105. By cycling current from the shared bus 180 through the DC to DC converter 282 the battery unit 105, the battery controller 111 may heat the battery unit 105 and improve the performance of the battery unit 105.

The battery controller 111 may modify 525 the reference state 231 using the objective map 114. In one embodiment, the objective map 114 modifies 525 the reference state 231 based on a parameter mismatch between parameters of the battery state 231 of one or more battery units 105. In one embodiment, the parameter mismatch is reduced to within the divergence limits 384.

In one embodiment, modifying 525 the reference state 231 reduces a rate of divergence of the parameter mismatch over time. In one embodiment, the rate of divergence of the parameter mismatch is reduced over the divergence time interval 382.

The battery controller 111 may modifies 525 the reference state 231 based on a capacity mismatch between a unit capacity 208 of the given battery unit 105 and one of a unit capacity 208 of a maximum capacity battery unit 105, an average unit capacity 208 of the plurality of battery units 105, and the predefined unit capacity 392. As a result, a battery unit 105 with a higher unit capacity 208 reaches a higher maximum unit state-of-charge 204 than a battery unit 105 with a lower unit capacity 208.

The upper limit of the open circuit unit voltage $V_{OC}$ 130 may be modified based on a unit capacity mismatch parameter wherein the unit capacity mismatch is calculated for each given ith battery unit 105 using Equation 1, where $V_{max}$ is a maximum unit voltage limit 216, K is the control constant 386, $Q_i$ is a unit capacity 208 of the given battery unit 105, and Q is one of a unit capacity 208 of a battery unit 105 with a greatest unit capacity 208 max(Q), an average unit capacity 208 of the plurality of battery units 105, and the predefined unit capacity 392. Equation 1 calculates a maximum open circuit unit voltage 130 for a charging unit current 109 to the battery unit 105. Reversing the unit current 109 modifies the Equation.

$$V_{OC,max} = V_{max} - K \frac{\partial V_{OC}}{\partial Q}(Q - Q_i) \qquad \text{Equation 1}$$

In one embodiment, unit capacity mismatch $\Delta Q_i$ given in Equation 2 is determined by the central controller 160 for each bypass converter 110. Alternatively, $\Delta Q_i$ may be determined locally by each unit bypass converter 110 using the shared bus voltage 145 and the data available locally from the battery sensors 150 and converter sensors 265.

$$\Delta Q_i = Q - Q_i \qquad \text{Equation 2}$$

In one embodiment, the unit capacity mismatch is calculated using Equation 3, where $I_{str}$ is the string current 194 $I_{g,i}$ is a bypass converter input current 193 for the given battery unit 105, $m_{nom}$ is the predefined nominal capacity 394 and $m_i$ is capacity parameter calculated as described below, As a result, each bypass converter 110 may calculate the unit objective map in a distributed manner. If there is a load current 195, Equation 3 is modified to account for the additional converter current.

$$\Delta Q_i = Q_i - \frac{m_i Q_i I_{str}}{m_{nom}(I_{str} + I_{g,i})} \qquad \text{Equation 3}$$

The capacity parameter $m_i$ may calculated using Equation 4, is where $V_{bus}$ is the shared bus voltage 145 and $b_i$ is a defined capacity constant. Parameter $m_i$ may be calculated for a give battery unit 105 and $m_{nom}$ may be the predetermined nominal capacity 394.

$$m_i = \frac{Q_i - b_i}{V_{bus}} \quad \text{Equation 4}$$

In one embodiment, the open circuit unit voltage $V_{OC}$ 130 may be modified using Equation 5, where $V_{OCD}$ is the modified shared bus reference voltage 136, $i_g$ is the bypass converter input current 194 and $R_{droop}$ is a droop control resistance. The bypass converter input current and the droop control resistance may be droop inputs 128.

$$V_{OCD} = V_{OC} - i_g * R_{droop} \quad \text{Equation 5}$$

The bypass converter may control 525 the unit state-of-charge 204 for the given battery unit 105 as a function of a unit voltage 130 and a unit resistance 213. In one embodiment, the state-of-charge is represented by the open circuit unit voltage 130. The open circuit unit voltage 130 may be calculated using Equation 6, wherein $V_{OC,i}$ is a unit voltage 130 at open circuit for a given ith battery unit 105, $V_{max}$ is a maximum unit voltage limit 216, $V_{min}$ is a minimum unit voltage limit 214, $R_i$ is a unit resistance 213 for the given battery unit, and $I_{max}$ is a maximum unit current for the given battery unit. Equation 6 calculates the unit voltage 130 for a charging unit current 109 to the battery unit 105. Reversing the unit current 109 modifies Equation 6.

$$V_{OC} = \frac{V_{max}(V_{OC,i} - R_i|I_{max}|) - V_{min}(V_{OC,i} + R_i|I_{max}|)}{V_{max} - V_{min} - 2R_i|I_{max}|} \quad \text{Equation 6}$$

The shared bus voltage 145 calculated using Equation 6 may maximize instantaneous unit power capability 218 for the battery unit 105.

The battery controller 111 may control 530 the battery state 201 a battery unit 105 to the reference state 231. In one embodiment, the reference state 231 is based on the shared bus voltage 145. In one embodiment, a parameter mismatch between the battery state 201 and the reference state 231 controlled 525 to minimize a reduction in unit capacity 208. The unit capacity 208 of the battery unit typically diminishes over time.

The battery controller 111 may decrease the rate of divergence of the battery state 201 from the reference state 231 for the battery unit 105. In one embodiment, the DC-DC controller 118 employs model predictive control (MPC) to decrease the rate of divergence the battery state 201 to the reference state 231.

Figure 5B:
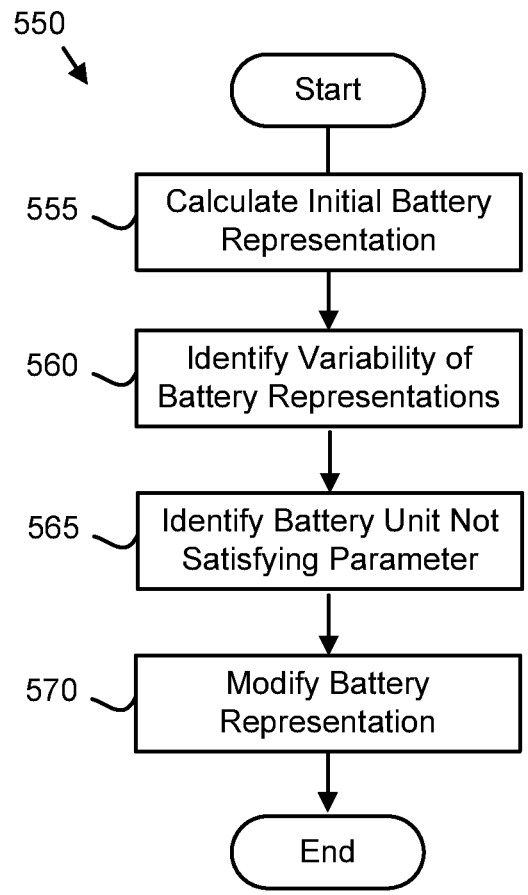
FIG. 5B is a schematic flow chart diagram illustrating one embodiment of a battery state modification method.

FIG. 5B is a schematic flow chart diagram illustrating one embodiment of a battery state modification method 550. The battery state modification method 550 may be performed by a battery controller 111. Alternatively, the method 550 may be performed by the central controller 160. In one embodiment, the method 550 is performed by a combination of one or more bypass converters 110 and the central controller 160. In a certain embodiment, the method 550 is performed by a processor. In addition, the method 550 may be performed by computer readable storage medium storing code.

The method 550 starts, and in one embodiment, the battery controller 111 calculates 555 the initial battery state 201 for the battery unit 105. The calculation 555 of the initial battery state 201 may be performed as part of the characterization of the battery unit 105 is described in FIG. 5E. Alternatively, the calculation 555 may be performed periodically such as after a representation calculation interval.

In one embodiment, the battery controller 111 identifies 560 the variability of the battery states 201 between the plurality of battery units 105. The battery controller 111 may compare parameters of the battery states 201 of the battery units 105. In one embodiment, if a first battery unit 105 has a parameter of the battery state 201 that exceeds a corresponding average of the parameters of the battery states 200 one of the other battery units 105 by greater than a variability threshold, the battery controller 111 may identify 560 the difference as a variability.

Alternatively, the battery controller 111 may rank parameters for each battery unit 105. If the first battery unit 105 has a parameter of the battery state 201 that is least desirable and that exceeds a corresponding parameter of the binary representation 201 of the battery unit with the next least desirable parameter of the battery state 201 by greater than the variability threshold, the central controller 160 may identify 560 the difference is a variability.

In one embodiment, the battery controller 111 may identify 565 a battery unit 105 that is not satisfying a parameter of the reference state 231. For example, the unit life time 221 may not satisfy the reference unit life time 253.

In one embodiment, the battery controller 111 modifies 570 the battery state 201 for each battery unit 105 and the method 550 ends. The battery state 201 may be modified 570 to decrease a rate of divergence of a parameter of the battery state 201 to the corresponding parameter of the reference state 231. For example, the battery state 201 may be modified to decrease a rate of divergence of the unit life time 221 from the reference unit life time 253. Alternatively, the battery state 201 may be modified to converge the unit life time 221 to the reference unit life time 253.

Alternatively, the battery controller 111 may modify 570 the battery state 201 for each battery unit 105 to reduce variability between the battery states 21. For example, the battery states 201 may be modified 570 to match the unit power capability 218 between the plurality of battery units 105. The battery state 201 of each battery unit 105 may be modified 570 so that the charging and discharging of the battery units 105 modifies the overall unit power capability 218 of the plurality of battery units 105.

In one embodiment, the battery state 201 for each battery unit 105 is modified 570 to extend a system lifetime of the battery system 100. In one embodiment, the system lifetime is a minimum of the unit lifetimes 221 for the plurality of battery units 105. Alternatively, the system lifetime may be an average of the unit lifetimes 221.

The battery state 201 for each battery unit 105 may be modified 570 to extend a range of the battery pack for a drive cycle. In one embodiment, the drive cycle may comprise charging the battery pack and then discharging the battery pack, such as to motivate an electric vehicle. The range may be a function of a sum of the unit power capabilities of the plurality of battery units 105.

Figure 5C:
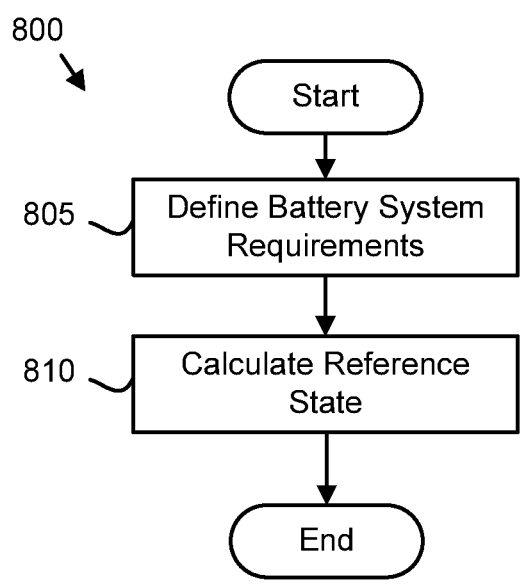
FIG. 5C is a schematic flow chart diagram illustrating one embodiment of a reference state determination method.

FIG. 5C is a schematic flow chart diagram illustrating one embodiment of a reference state determination method 800. The reference state determination method 800 may be performed by a battery controller 111. In one embodiment, the method 800 is performed by a combination of one or more bypass converters 110 and the central controller 160. In a certain embodiment, the method 800 is performed by a processor. In addition, the method 800 may be performed by computer readable storage medium storing code.

The method 800 starts, and in one embodiment, the bypass controller 110 and/or the central controller 160 defines 805 requirements for the battery system 100. The requirements may include a system power, the system voltage, a system current, and a system discharge rate. The requirements may be based on power needs of the device such as an electric car.

In one embodiment, the requirement may be one or more of the reference capacity 238, a reference state-of-health 241, a reference power capability 248, and a reference unit lifetime 253.

The battery controller 111 may further calculate 810 the reference state 231 and the method 800 ends. In one embodiment, a single reference state 231 is calculated for all battery units 105. Alternatively, a unique reference state 231 may be calculated for each battery unit 105.

In one embodiment, the battery controller 111 may calculate 810 the divergence time interval 382 and the divergence limits 384. The divergence time interval 382 may be short if the requirements specify to more rapidly decrease a rate of divergence of the battery state 201 from the reference state 231. Alternatively, the divergence time interval 382 may be long if the requirements specify slowly reducing the rate of divergence of the battery state 201 from the reference state 231.

The divergence limits 384 may be narrow if the requirements specify to more rapidly decrease the rate of divergence of the battery state 201 from the reference state 231. In addition, the divergence limits 384 may be broad if the requirements allow a slow decrease of the rate of divergence of the battery state 201 from the reference state 231.

In addition, the battery controller 111 may calculate 810 the control constant 386 based on the divergence time interval 382 and/or the divergence limits 384. For example, if the divergence time interval 382 is short and/or the divergence limits 384 are narrow, the control constant 386 may be high. Alternatively, if the divergence time interval 382 is long and/or the divergence limits 384 are broad, the control constant 386 may be low.

Figure 5D:
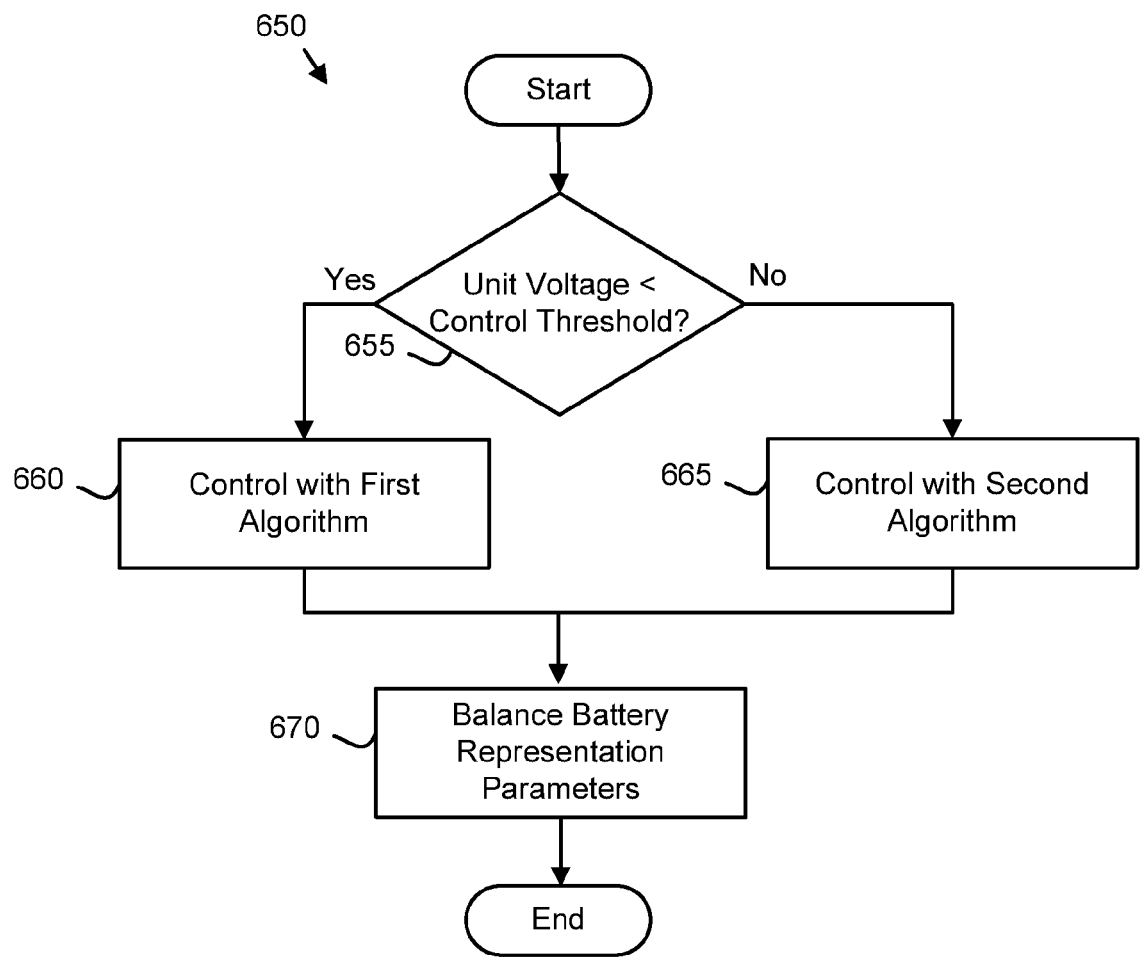
FIG. 5D is a schematic flow chart diagram illustrating one embodiment of a balancing control method.

FIG. 5D is a schematic flow chart diagram illustrating one embodiment of a balancing control method 650. The balancing control method 650 may be performed by a battery controller 111 to reduce a parameter mismatch two or more battery state parameters. In one embodiment, the method 650 is performed by a combination of one or more bypass converters 110 and the central controller 160. In a certain embodiment, the method 650 is performed by a processor. In addition, the method 650 may be performed by a computer readable storage medium storing code.

The method 650 starts, and in one embodiment, the battery controller 111 determines 655 if one or more first parameters of the battery state 201 are less than the control threshold 304. In addition, the battery controller 111 may balance the unit life time 221 of one or more battery units 105 and the unit power capability 218 of the one or more battery units.

If the one or more first battery parameters are less than the control threshold 304, the battery controller 111 may control 660 the battery state 201 to the reference state 231 using a first algorithm. The first algorithm may calculate a minimum open circuit unit voltage 130 using Equation 6.

In one embodiment, the first algorithm calculates the lower limit of the unit voltage $V_{OC,imin}$ 130 at open circuit using Equation 7, where $V_{min}$ is a minimum unit voltage limit 214, $I_{max}$ is a maximum unit current 109, $R_i$ is a unit resistance 213 for the given battery unit 105, and R is one of an average unit resistance 213 for the plurality of battery units, a unit resistance 213 of a maximum resistance battery unit 105, and the predefined unit resistance 396. Equation 7 calculates the lower limit of the unit voltage 130 for a discharging unit current 109 to the battery unit 105. Reversing the current modifies Equation 7.

$$V_{OCimin} = V_{min} - I_{max}(R - R_i) \quad \text{Equation 7}$$

If the one or more first battery parameters are not less than the control threshold 304, the battery controller 111 may control 665 the battery state 201 to the reference state 231 using a second algorithm. In one embodiment, the second algorithm calculates the upper limit of the open circuit unit voltage $V_{OC,i}$ 130 at open circuit using Equation 1.

By selecting the first algorithm or the second algorithm based on the relationship of the one or more first parameters to the control threshold, the battery controller 111 balances 670 the two or more battery state parameters, such as the unit life time 221 and the unit power capability 218, and the method 650 ends.

Figure 5E:
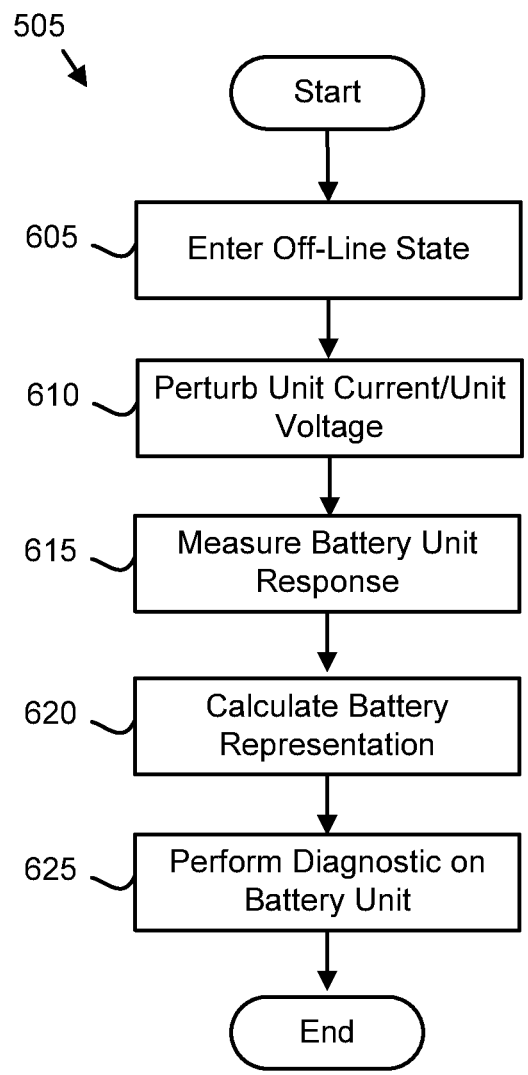
FIG. 5E is a schematic flowchart diagram illustrating one embodiment of a battery characterization method.

FIG. 5E is a schematic flowchart diagram illustrating one embodiment of a battery characterization method 600. The battery characterization method 600 may determine the battery state 201. The battery characterization method 600 may be performed by a battery controller 111. Alternatively, the method 600 may be performed by the central controller 160. In one embodiment, the method 600 is performed by a combination of one or more bypass converters 110 and the central controller 160. In a certain embodiment, the method 600 is performed by a processor. In addition, the method 600 may be performed by computer readable storage medium storing code.

The method 600 starts, and in one embodiment, the battery controller 111 enters 605 an off-line state. The battery controller 111 may enter 605 the off-line state while the battery system 100 is not being discharged. The battery controller 111 may enter 605 the off-line state in response to a command. Alternatively, the battery controller 111 may automatically enter 605 the off-line state when the battery system 100 has not been discharged for an unused time interval.

In a certain embodiment, the battery controller 111 perturbs 610 one of the unit current 109 and/or the unit voltage 130 for the battery unit 105. For example, the battery controller 111 may vary the unit current and/or the unit voltage of the battery unit 105. The battery controller 111 may perturbs 610 the battery unit 105 by placing the battery unit 105 in a no load state.

In an alternate embodiment, the battery controller 111 perturbs 610 the battery unit 105 by drawing no unit current 109 from the battery unit 105 in a no load state for a perturbation time interval, followed by drawing unit current 109 at one of the maximum unit voltage limit 216 and the unit power capability 218 for the perturbation time interval. In addition, the battery controller 111 may subsequently draw no unit current 109 from the battery unit 105 for the perturbation time interval.

The battery sensors 150 may measure 615 the unit voltage 130 in the unit current 109 during the perturbation 610 of the battery unit 105. The battery controller 111 may determine the battery state 201 from the measurements of the battery unit 105 from the perturbation 610 is described in step 510 of FIG. 5A.

In one embodiment, the battery controller 111 calculates 620 the battery state 201. The battery state 201 may include at least one of the unit impedance 212, the unit capacity 208, the unit temperature 217, the unit state-of-charge 204, and the unit state-of-health 209 for the battery unit 105.

In one embodiment, the unit state-of-charge 204 is calculated 620 as a function of the unit voltage 130 of the battery unit 105 in a no load state VNL. The unit voltage 130 in the no load state VNL may be calculated as a function of the unit voltage 130, the unit current 109, and a unit resistance 213 of the battery unit 105. In one embodiment, the unit voltage 130 in the no load state VNL is calculated using Equation 7, where VB is the measured unit voltage 130, RB is the unit resistance 213 of the battery unit 105 and battery unit connections, and IB is the unit current 109 of the battery unit 105. Equation 8 calculates VNL for a unit current 109 flowing from the battery unit 105. Reversing the flow will modify Equation 8.

$$VNL=VB+(RB*IB) \quad \text{Equation 8}$$

In one embodiment, the battery controller 111 performs 625 a diagnostic on the battery unit 105. The battery model 260 may employ the measurements of the battery sensors 150 to diagnose failures and potential failures for the battery unit 105. In addition, information from the diagnostic may be included in the battery state 201.

Figure 5F:
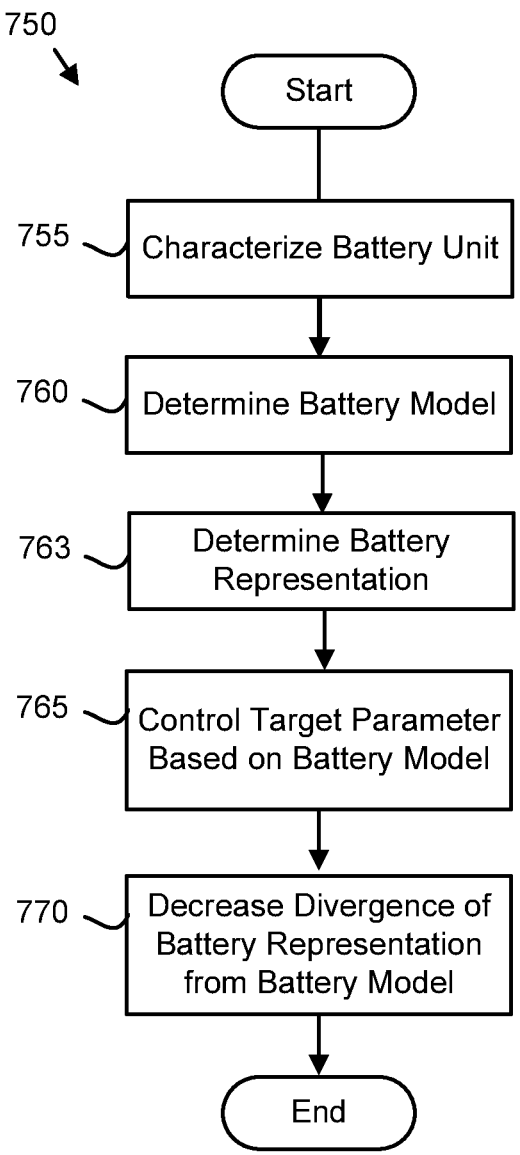
FIG. 5F is a schematic flowchart diagram illustrating one embodiment of a battery model control method.

FIG. 5F is a schematic flowchart diagram illustrating one embodiment of a battery model control method 750. The battery model control method 750 may determine the battery state 201. The battery characterization method 750 may be performed by the battery controller 111. In a certain embodiment, the method 750 is performed by a processor. In addition, the method 750 may be performed by computer readable storage medium storing code.

The method 750 starts, and in one embodiment, the battery controller 111 characterizes 755 the battery unit 105 as described in FIG. 5E. In addition, the battery controller 111 may determine 760 the battery model data 261 for the battery unit 105.

The objective map 114 may determine 763 the battery state 201 in response to inputs from one or more of a temperature sensor, an optical sensor, a voltage sensor, a current sensor, a pH sensor, a strain sensor, a pressure sensor, and a gas composition sensor. For example, the battery model may determine the battery state 201 based on the unit temperature 217, optical data 262, unit voltage 130, unit current 109, pH data 200 before, strain data 266, pressure data 268, and gas composition data 270.

The battery controller 111 may control 765 the target parameter based on the battery model data 261. In one embodiment, the battery controller 111 control 765 the target parameter to decrease 770 a rate of divergence of the battery state 201 from the battery model data 261 and the method 750 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a shared bus comprising a power bus; and
a plurality of isolated direct current (DC) to DC bypass converters, each bypass converter associated with one battery unit, inputs of each bypass converter in parallel electrical connection with the associated battery unit, outputs of each bypass converter in parallel electrical connection with the shared bus,
wherein each bypass converter estimates a battery state for the battery unit connected to the bypass converter and controls the battery state of the associated battery unit relative to a reference state, wherein the reference state is proportional to a voltage of the shared bus,
wherein each bypass converter controls the battery state of the battery unit associated with the bypass converter as a function of change in voltage of the shared bus.

2. The apparatus of claim 1, wherein each bypass converter further modifies the reference state using an objective map based on a parameter mismatch between one or more battery units.

3. The apparatus of claim 2, wherein modifying the reference state reduces a rate of divergence of the parameter mismatch.

4. The apparatus of claim 2, wherein the reference state further is modified in response to a bypass converter input current and a droop resistance.

5. The apparatus of claim 2, wherein the battery state comprises a unit state-of-charge and the parameter mismatch is a capacity mismatch between a unit capacity of the given battery unit and one of a unit capacity of a maximum capacity battery unit, an average unit capacity of the plurality of battery units, and a predefined unit capacity, such that a battery unit with a higher unit capacity reaches a higher maximum unit state-of-charge than a battery unit with a lower unit capacity.

6. The apparatus of claim 1, wherein the battery state comprises a unit state-of-charge and the parameter mismatch is a unit capacity mismatch between a unit capacity of the given battery unit and one of a unit capacity of a maximum capacity battery unit, an average unit capacity, and a predefined unit capacity if the unit state-of-charge exceeds a control threshold and the parameter mismatch is a unit resistance mismatch between a unit resistance of the given battery unit and one of an average unit resistance for the plurality of battery units, a unit resistance of a maximum resistance battery unit, and a predefined unit resistance if the unit state-of-charge is less than the control threshold.

7. The apparatus of claim 1, further comprising a battery charger connected in parallel electrical connection to the plurality of battery units, and in communication with one or more of a central controller, the shared bus, and the plurality of bypass converters, and wherein the battery charger modifies the charging current based on the communications.

8. The apparatus of claim 1, the apparatus further comprises a capacitor in parallel electrical connection with the shared bus.

9. An apparatus comprising:
a shared bus;
a plurality of battery units;
a plurality of isolated direct current (DC) to DC bypass converters, each bypass converter associated with one battery unit of the plurality of battery units and inputs of each bypass converter in parallel electrical connection with the associated battery unit, outputs of each bypass converter in parallel electrical connection with the shared bus; and
a central controller that estimates a battery state for each battery unit and controls the battery state of a battery unit as a function of change to a reference state using the bypass converter of the battery unit, wherein the reference state is proportional to a voltage of the shared bus.

10. The apparatus of claim 9, wherein the battery controller further modifies the reference state using an objective map based on a parameter mismatch between one or more battery units.

11. The apparatus of claim 10, wherein modifying the reference state reduces a rate of divergence of the parameter mismatch.

12. The apparatus of claim 10, wherein the objective map is embodied in one of one or more bypass converters and the central controller.

13. The apparatus of claim 9, wherein the reference state further is modified by a droop controller in response to a bypass converter input current and a droop resistance.

14. The apparatus of claim 9, wherein a droop controller is embodied in one of one or more bypass converters and the central controller.

15. The apparatus of claim 9, wherein the battery state comprises a unit state-of-charge and the parameter mismatch is a capacity mismatch between a unit capacity of the given battery unit and one of a unit capacity of a maximum capacity battery unit, an average unit capacity of the plurality of battery units, and a predefined unit capacity, such that a battery unit with a higher unit capacity reaches a higher maximum unit state-of-charge than a battery unit with a lower unit capacity.

16. The apparatus of claim 9, wherein the battery state comprises a unit state-of-charge and the parameter mismatch is a unit capacity mismatch between a unit capacity of the given battery unit and one of a unit capacity of a maximum capacity battery unit, an average unit capacity, and a predefined unit capacity if the unit state-of-charge exceeds a control threshold and the parameter mismatch is a unit resistance mismatch between a unit resistance of the given battery unit and one of an average unit resistance for the plurality of battery units, a unit resistance of a maximum resistance battery unit, and a predefined unit resistance if the unit state-of-charge is less than the control threshold.

17. The apparatus of claim 9, wherein the reference state further is modified in response to a bypass converter input current and a droop resistance.

18. The apparatus of claim 9, the apparatus further comprises a capacitor in parallel electrical connection with the shared bus.

19. The apparatus of claim 1, wherein the bypass controller associated with a battery unit controls state of charge of a battery unit proportional to a voltage range of the shared bus.

20. The apparatus of claim 9, wherein the central controller, using the bypass controller associated with a battery unit, controls state of charge of a battery unit proportional to a voltage range of the shared bus.

* * * * *

UNITED STATES PATENT AND TRADEMARK OFFICE
CERTIFICATE OF CORRECTION

| | |
|---|---|
| PATENT NO. | : 10,063,066 B2 |
| APPLICATION NO. | : 14/591917 |
| DATED | : August 28, 2018 |
| INVENTOR(S) | : Regan A. Zane et al. |

Page 1 of 1

It is certified that error appears in the above-identified patent and that said Letters Patent is hereby corrected as shown below:

In the Specification

Column 1, Line 9 & 10 should read:
This invention was made with government support under award DE-AR0000271 awarded by the Department of Energy. The government has certain rights in the invention.

Signed and Sealed this
Twelfth Day of February, 2019

Andrei Iancu
*Director of the United States Patent and Trademark Office*